(12) United States Patent
Chen et al.

(10) Patent No.: US 12,307,508 B2
(45) Date of Patent: May 20, 2025

(54) SYSTEMS AND METHODS FOR ESTABLISHING AND MANAGING A MULTI-MODAL TRANSPORTATION ECOSYSTEM

(71) Applicant: Lyft, Inc., San Francisco, CA (US)

(72) Inventors: Tom Tao Chen, San Carlos, CA (US); Brian Geoffrey Hildebrand, San Francisco, CA (US); Ameesha Sara Isaac, San Francsico, CA (US); Ryan Jadhav, San Francisco, CA (US); Pavan Kulkarni, San Francisco, CA (US); Kaan Meralan, San Francisco, CA (US); Yafeng Wang, Santa Clara, CA (US)

(73) Assignee: Lyft, Inc., San Francisco, CA (US)

(*) Notice: Subject to any disclaimer, the term of this patent is extended or adjusted under 35 U.S.C. 154(b) by 825 days.

(21) Appl. No.: 17/121,486

(22) Filed: Dec. 14, 2020

(65) Prior Publication Data

US 2022/0114655 A1  Apr. 14, 2022

Related U.S. Application Data

(60) Provisional application No. 63/090,071, filed on Oct. 9, 2020.

(51) Int. Cl.
*G06Q 30/0645* (2023.01)
*G01C 21/34* (2006.01)
(Continued)

(52) U.S. Cl.
CPC ..... *G06Q 30/0645* (2013.01); *G01C 21/3423* (2013.01); *G06Q 10/02* (2013.01);
(Continued)

(58) Field of Classification Search
CPC .... G06Q 30/0645; G06Q 10/02; G06Q 10/20; G06Q 30/0625; G06Q 50/40;
(Continued)

(56) References Cited

U.S. PATENT DOCUMENTS 9,940,596 B1\* 4/2018 Briggs ................... H04W 4/02
10,895,463 B1\* 1/2021 Cope .................. G01C 21/3423
(Continued)

OTHER PUBLICATIONS

Dimokas, N., Kalogirou, K., Spanidis, P., & Kehagias, D. (Jul. 2018). A mobile application for multimodal trip planning. In 2018 9th International Conference on Information, Intelligence, Systems and Applications (IISA) (pp. 1-8). IEEE. (Year: 2018).\*
(Continued)

*Primary Examiner* — John S. Wasaff
(74) *Attorney, Agent, or Firm* — Greenberg Traurig, LLP

(57) ABSTRACT

The disclosed computer-implemented method may include creating a digital transportation pass that allows transportation requestor devices to request transportation via the digital transportation pass within a multi-modal transportation ecosystem. The method may further include receiving a transportation request from a transportation requestor device. The method may also include determining that the transportation request satisfies one or more redemption criteria for redeeming the digital transportation pass, and then fulfilling the transportation request in response to determining that the transportation request satisfies the redemption criteria. Various other methods, systems, and computer-readable media are also disclosed.

19 Claims, 25 Drawing Sheets

(51) Int. Cl.
  *G06Q 10/02* (2012.01)
  *G06Q 10/20* (2023.01)
  *G06Q 30/0601* (2023.01)
  *G06Q 50/40* (2024.01)
  *G08G 1/00* (2006.01)

(52) U.S. Cl.
  CPC ......... *G06Q 10/20* (2013.01); *G06Q 30/0625* (2013.01); *G06Q 50/40* (2024.01); *G08G 1/20* (2013.01)

(58) Field of Classification Search
  CPC .. G01C 21/3423; G01C 21/3697; G08G 1/20; G08G 1/202
  See application file for complete search history.

(56) References Cited

U.S. PATENT DOCUMENTS

| | | | | |
|---|---|---|---|---|
| 2003/0109266 | A1* | 6/2003 | Rafiah | G01C 21/3423 455/456.1 |
| 2010/0305984 | A1* | 12/2010 | Ben-Yitschak | G06Q 10/025 707/769 |
| 2015/0228193 | A1* | 8/2015 | Bick | G08G 1/096883 340/990 |
| 2017/0167882 | A1* | 6/2017 | Ulloa Paredes | G01C 21/3438 |
| 2018/0068337 | A1* | 3/2018 | Fiorucci | H04W 4/80 |
| 2018/0275661 | A1* | 9/2018 | Glaser | G06Q 50/40 |
| 2019/0051174 | A1* | 2/2019 | Haque | G08G 1/202 |
| 2019/0056233 | A1* | 2/2019 | Liu | G01C 21/3484 |
| 2019/0236743 | A1* | 8/2019 | Bonanni, III | G06Q 20/322 |
| 2019/0311630 | A1* | 10/2019 | VanderZanden | G01C 21/3438 |
| 2020/0173808 | A1* | 6/2020 | Beaurepaire | G06Q 50/40 |
| 2020/0250773 | A1* | 8/2020 | Wilhelm | G06Q 50/14 |
| 2020/0300645 | A1* | 9/2020 | Schirano | G01C 21/3676 |
| 2020/0355510 | A1* | 11/2020 | Tan | G01C 21/343 |
| 2021/0241234 | A1* | 8/2021 | Tian | G06Q 10/1093 |
| 2022/0113146 | A1* | 4/2022 | Colon | G01C 21/3423 |

OTHER PUBLICATIONS

Zografos, K., Spitadakis, V., & Androutsopoulos, K. (2008). Integrated passenger information system for multimodal trip planning. Transportation Research Record, 2072(1), 20-29. (Year: 2008).*

Borole, N., Rout, D., Goel, N., Vedagiri, P., & Mathew, T. V. (2013). Multimodal public transit trip planner with real-time transit data. Procedia-Social and Behavioral Sciences, 104, 775-784. (Year: 2013).*

Calvillo et al., "Utilizing a Transportation Matching System in Conjunction With a Multi-Track Vehicle Service Center to Service Transportation Vehicles", U.S. Appl. No. 16/834,567, filed Mar. 30, 2020, 121 pages.

Abdulla et al., "Dynamically Determining Provider-Transportation Routes and Rental-Vehicle Routes for a Multi-Modal Graphical User Interface", U.S. Appl. No. 16/834,977, filed Mar. 30, 2020, 146 pages.

* cited by examiner

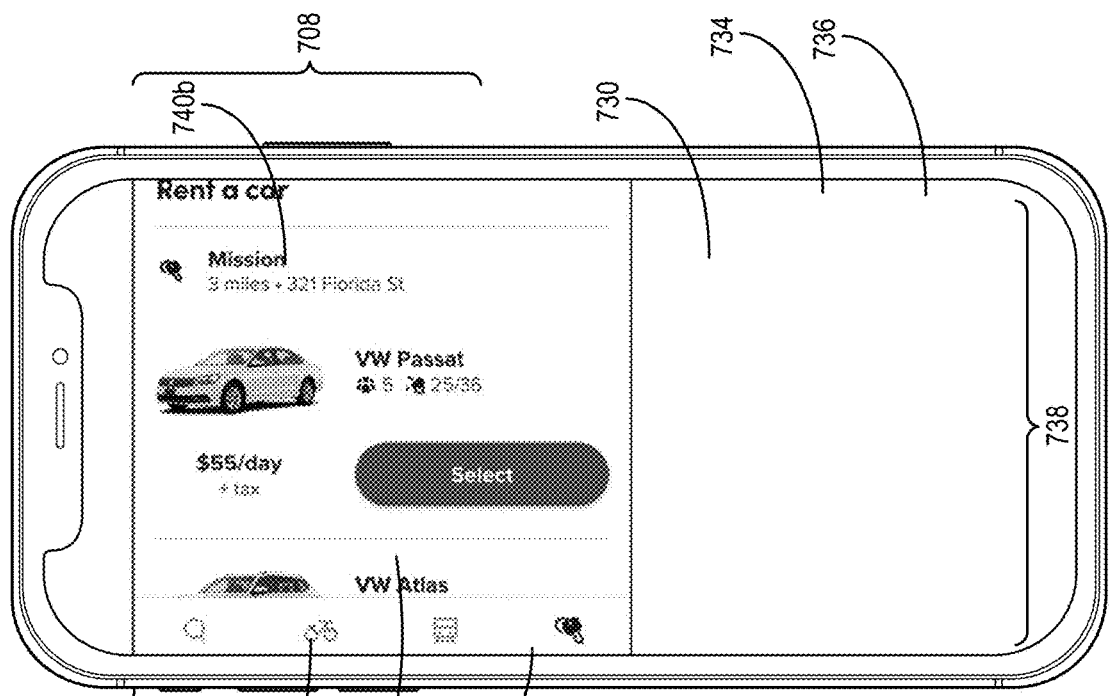
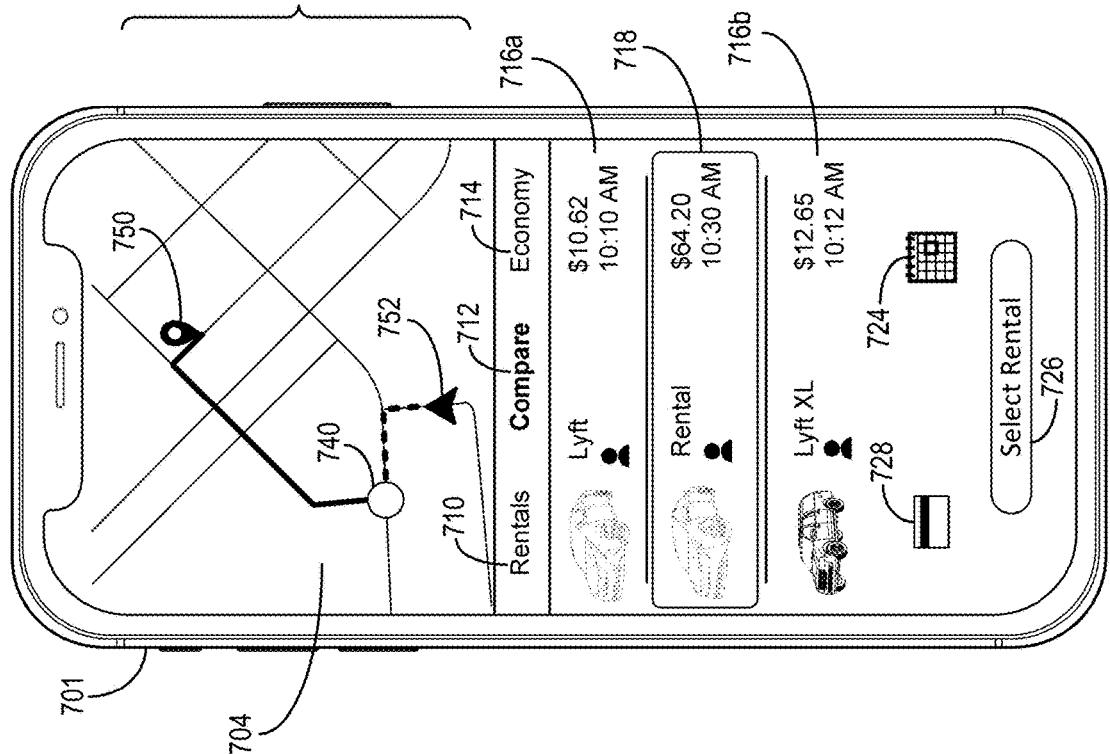
FIG. 7B
FIG. 7A

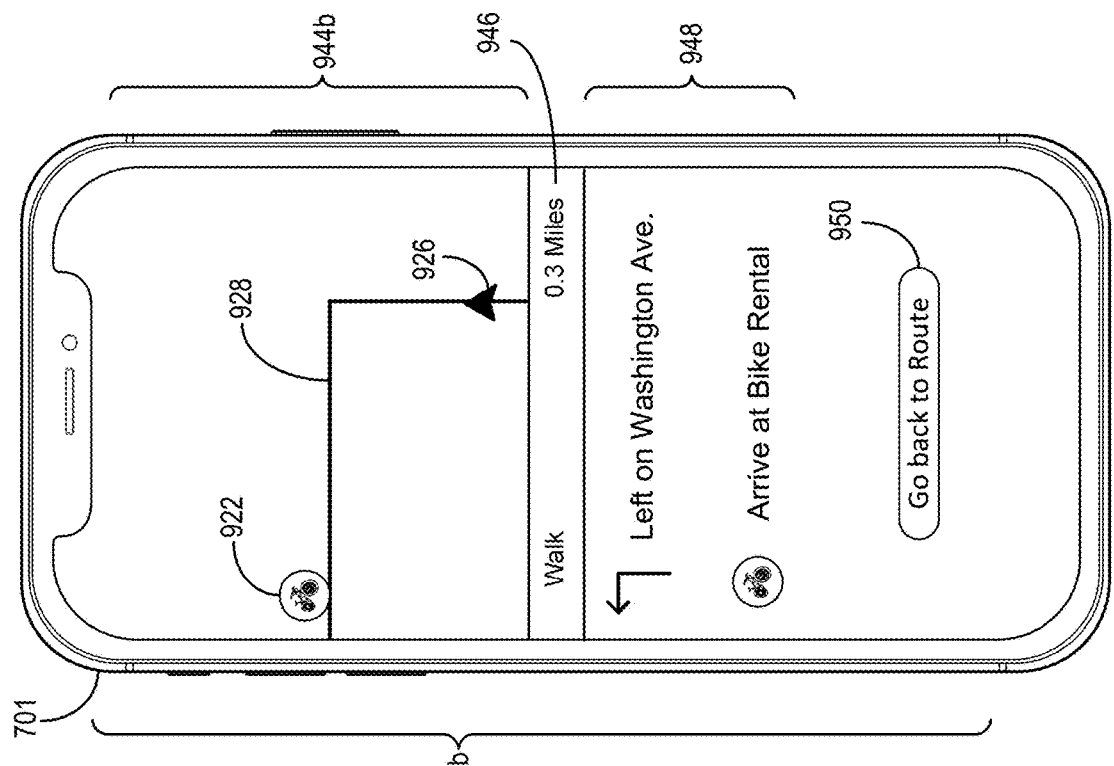
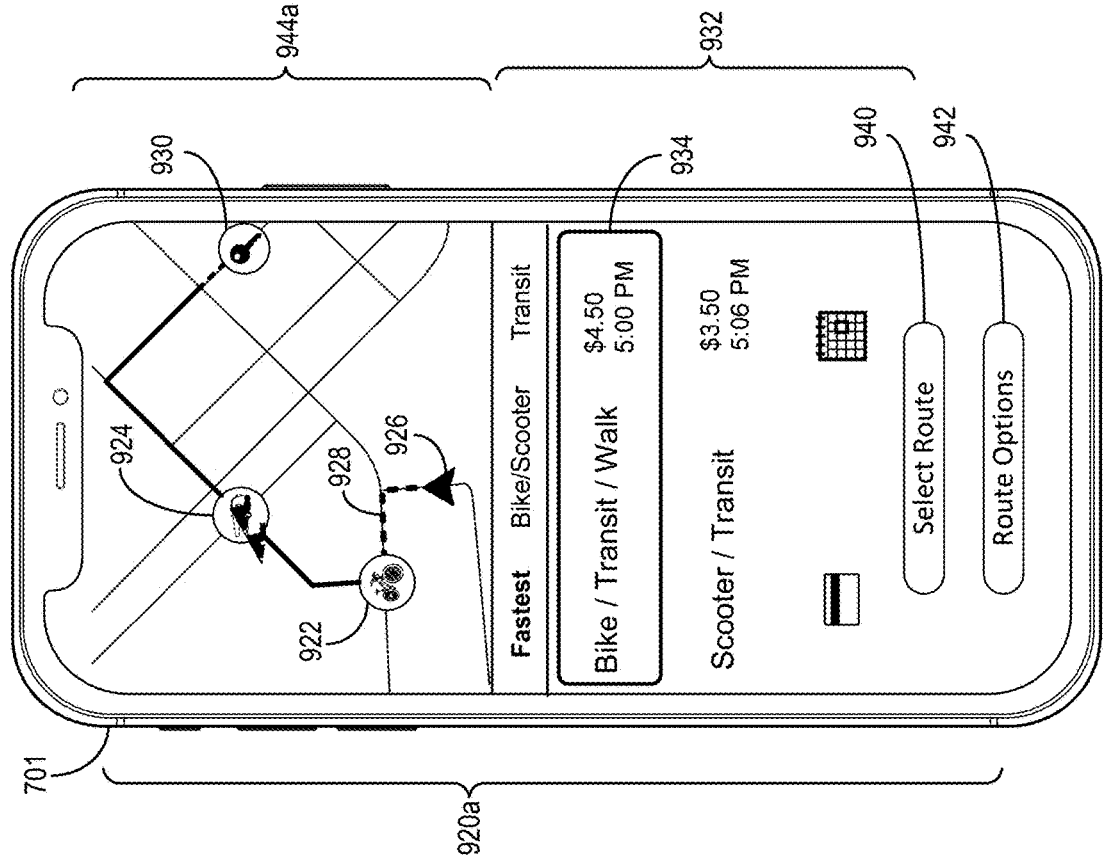

SYSTEMS AND METHODS FOR ESTABLISHING AND MANAGING A MULTI-MODAL TRANSPORTATION ECOSYSTEM

CROSS REFERENCE TO RELATED APPLICATION

This application claims the benefit of U.S. Provisional Application No. 63/090,071, filed 9 Oct. 2020, the disclosure of which is incorporated, in its entirety, by this reference.

BACKGROUND

Large organizations (such as companies and universities) often have expansive campuses with many buildings and thousands of employees or students commuting to, from, and within the same on a daily basis. While organizations such as these may wish to provide transportation for (or help cover or offset the transportation costs of) their employees/students, doing so can be a challenge due to the complexity, type, and number of locations and transportation modalities involved. For example, a student of a university may ride their bike to a public bus stop, take the bus to their university's campus, use a rented scooter to navigate between buildings on campus, meet a friend for lunch off campus using a ride sharing service, and return home at night via the subway, all on the same day. In this example, while the university could cover or offset the cost of a public bus pass for its students, the student would still be left to cover the cost of the rented scooter, shared ride, and subway pass. In addition, the university would lack control over, or insight into, the various transportation modalities used by its students, potentially leading to increased costs, traffic congestion, and/or safety concerns.

In another example, an employee may utilize a ride sharing service to move between locations on their employer's campus. If these rides are part of the user's job, the user may need to seek approval prior to requesting the ride and may need to subsequently request reimbursement for the ride after it has been completed. This process of approving and reimbursing rides may become overly burdensome, especially when the employer or other entity has many thousands of employees taking one or even multiple rides per day. Moreover, this process may be complicated by employees who request rides that originate on the employer's campus but end at a destination that is off campus or originate on a day or a time during which the employer's business is not open. Managing such transportation requests may consume an ever-increasing amount of resources.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 7A and 7B illustrate graphical user interfaces for selecting a rental transportation vehicle in accordance with one or more embodiments.

FIGS. 9A-9E illustrate graphical user interfaces identifying intermediate vehicles and presenting intermediate routes to locations of intermediate vehicles in accordance with one or more embodiments.

Figure 1:
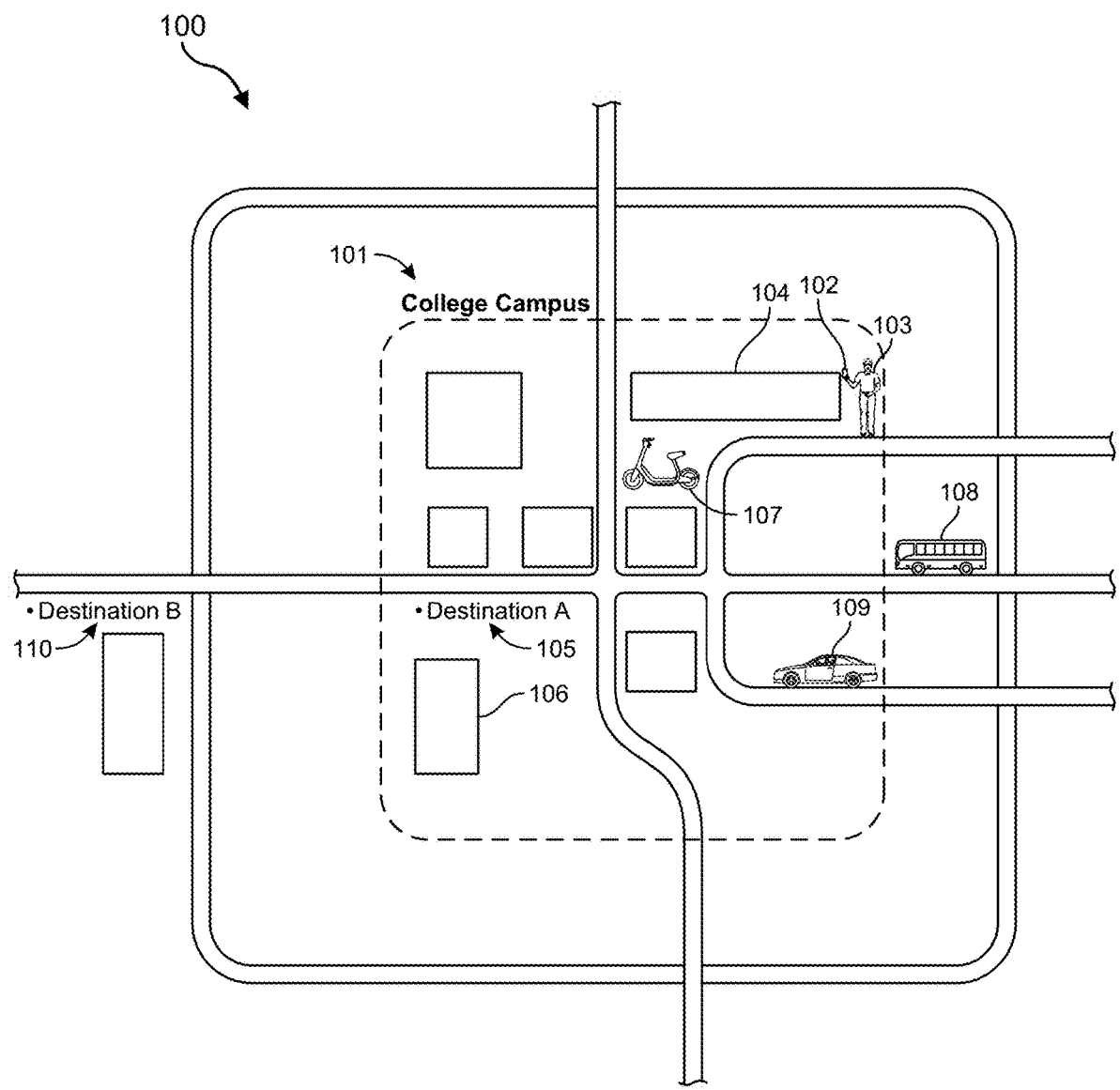
FIG. 1 is an illustration of an example scenario involving a single transportation provider and multiple possible transportation destinations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

This application is generally directed to a system for enabling entities, such as businesses and universities, to create local multi-modal transportation ecosystems via a custom offering referred to herein as a "digital transportation pass." For example, a university, company, or other type of entity may create a custom digital transportation pass that enables their students, employees, customers, or other group members to get to/from or around their campuses via a variety of different transportation modalities (e.g., shared rides, bikes, scooters, rental vehicles, public transportation, etc.). In some cases, the entity controlling the pass may place a variety of different limits on the same, including the duration of the pass (e.g., start and end dates, such as for the 2020-2021 school year), the type of benefit offered by the pass (e.g., monetary credit, number of permitted rides, etc.), time-of-day limits (e.g., weekdays only), distance limits (e.g., within a specified radius or custom geofence), origin/ destination limits (e.g., to or from work only), modality limits (e.g., shared rides only), ride frequency limits, or other limits on use.

Each entity that purchases a pass for its users may have control over when and how the passes are used. An entity may also specify whether the pass will expire (e.g., as a one-time pass) or will renew (e.g., on a monthly basis). Entities may share passes in a number of ways, including through various enrollment codes. These enrollment codes may include auto-generated custom codes (e.g., "BUSI-NESSTEAM") that may be transmitted to a specific team, division, or other group of users. Other enrollment codes may be unique to a given user and may only be claimed by that user. The enrollment codes may be transmitted and received by phone number, by email (e.g., all company-associated email accounts may be permitted to redeem and use the company's pass), by text message, through an application, or through some other form of digital transmission. In some cases, the digital transportation pass may also provide access to rental vehicles, which users may pick up at specified locations and use subject to the conditions specified above, such as for a certain number of hours or days or within specified geographical areas.

The digital transportation pass may also provide access to optimized vehicle service centers, where the user can schedule to have their vehicle serviced at an efficient and highly optimized service center (e.g., while they are at work). In some cases, users may request a driver to pick up their car, take it to the service center where the maintenance is performed, and return the car back to its original location, all as a digital transportation pass feature. Alternatively, a user may schedule mobile maintenance to come to them and work on their car while it is parked during the day. In some cases, the digital transportation pass may integrate with existing offerings, such as other transportation passes, so that while a user is within the constraints of the digital transportation pass (e.g., while on campus or within an employer-defined zone), the digital transportation pass is used for rides and, if the user is traveling outside of the defined zone, the app will access the user's other transportation pass to cover the difference.

As will be explained in greater detail below, in some examples the above-described concepts may leverage, utilize, and/or be implemented within a dynamic transportation matching system. This dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement (e.g., rental cars). In some examples, the dynamic transportation network may include lane-bound vehicles (e.g., cars, light trucks, etc.) that are primarily intended for operation on roads. Furthermore, the dynamic transportation network may include personal mobility vehicles (PMVs) and/or micro-mobility vehicles (MMVs) that are not bound to traditional road lanes, such as scooters, bicycles, electric scooters, electric bicycles, and/or any other suitable type of PMV and/or MMV. In some embodiments, a dynamic transportation network may include autonomous vehicles (e.g., self-driving cars) that may be capable of operating with little or no input from a human operator.

FIG. 1 is an illustration of an example scenario involving a single transportation provider and multiple possible transportation destinations. As shown in FIG. 1, a transportation requestor 103 (such as a student of a university) may, via a transportation requestor device 102, request and receive transportation to multiple locations using a variety of different transportation modalities. In some traditional scenarios, a university or employer may subsidize or pay for a public transportation pass that allows its users to take public transportation (e.g., bus 108) to and from campus. However, the issuing entity may have little to no control over when and where those passes are used. As such, the cost of the passes may be higher, as there are few to no limits on how the public transit passes are used.

In other traditional cases, entities such as employers and universities may wish to subsidize or pay for use of PMVs or MMVs on or around campus. For instance, transportation requestor 103 may wish to travel from building 104 to building 106 at destination A (105). The transportation requestor may request access to scooter 107, or may hail a ridesharing vehicle 109. In such cases, because destination A (105) is on campus 101, the entity may have no issue paying for the transportation. However, if the transportation requestor 103 wishes to travel to a destination off campus (e.g., destination B (110), the entity may not be willing to pay for this transportation, or may wish to pay less for this transportation, especially if the destination off campus is many miles away. Traditional systems lack the ability to control or regulate such fine-grained transportation usage.

Contrary to these traditional implementations, FIGS. 2A-2E illustrate embodiments of a digital transportation pass over which entities such as universities and employers may have a great deal of control at a variety of different levels. As detailed above, any entity that creates or purchases a digital transportation pass may specify various redemption criteria that control how and when the digital transportation pass may be redeemed or used. FIGS. 2A-2E are illustrations of example scenarios in which a digital transportation pass coverage zone is altered based on such criteria. As shown in these figures, for example, an entity may place various location- or distance-based limits on a digital transportation pass, such as by specifying that the pass can only be used within a specified radius (e.g., pass coverage zone 215A or 215B), specifying that the pass can only be used within a custom geofence (e.g., pass coverage zone 215C or 215D), and/or specifying that the pass can only be used for transportation to or from specific destinations (e.g., to or from school only).

Figure 2A:
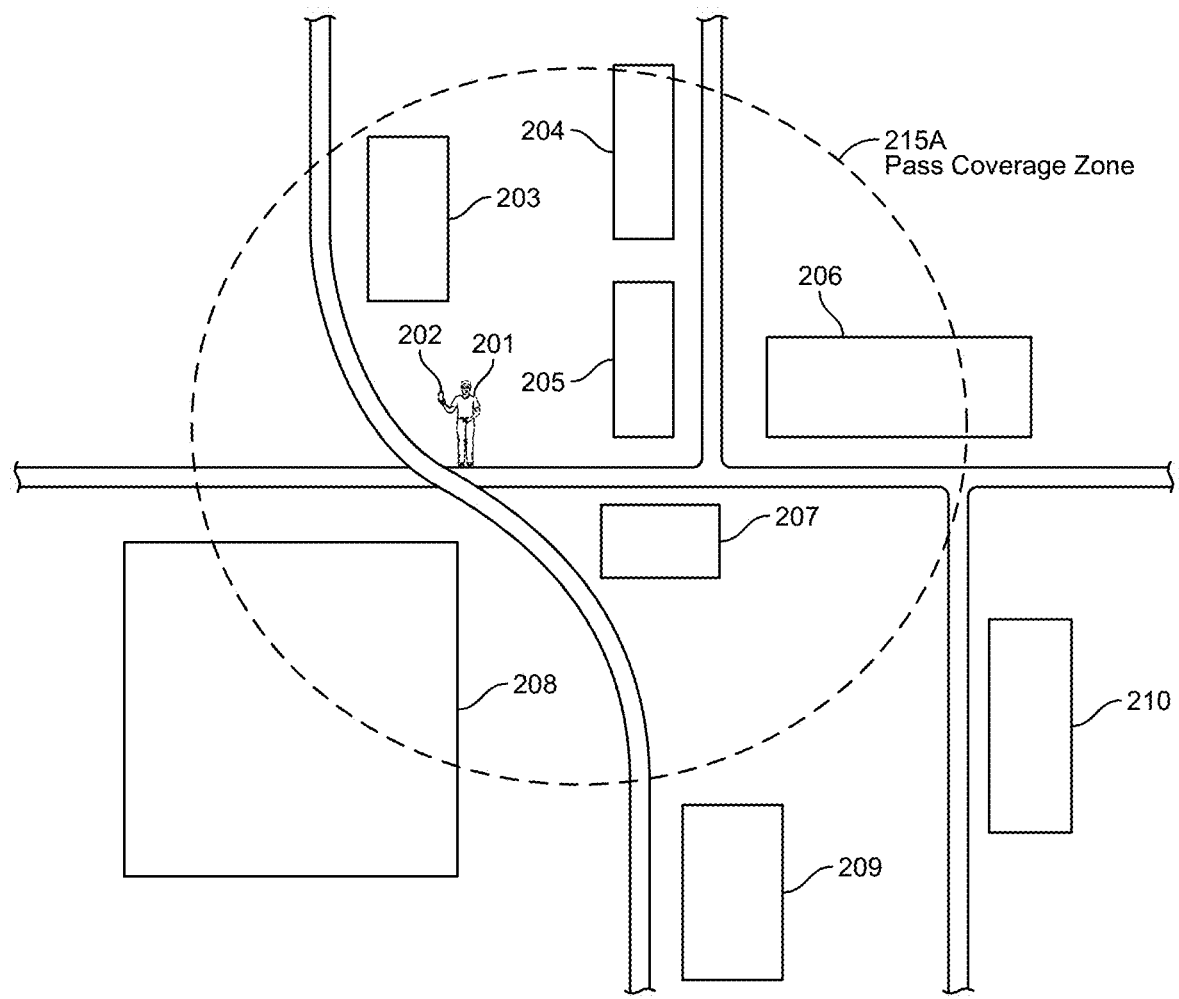
FIGS. 2A-2E are illustrations of example scenarios in which a digital transportation pass coverage zone is altered based on settings or criteria.
Figure 2B:
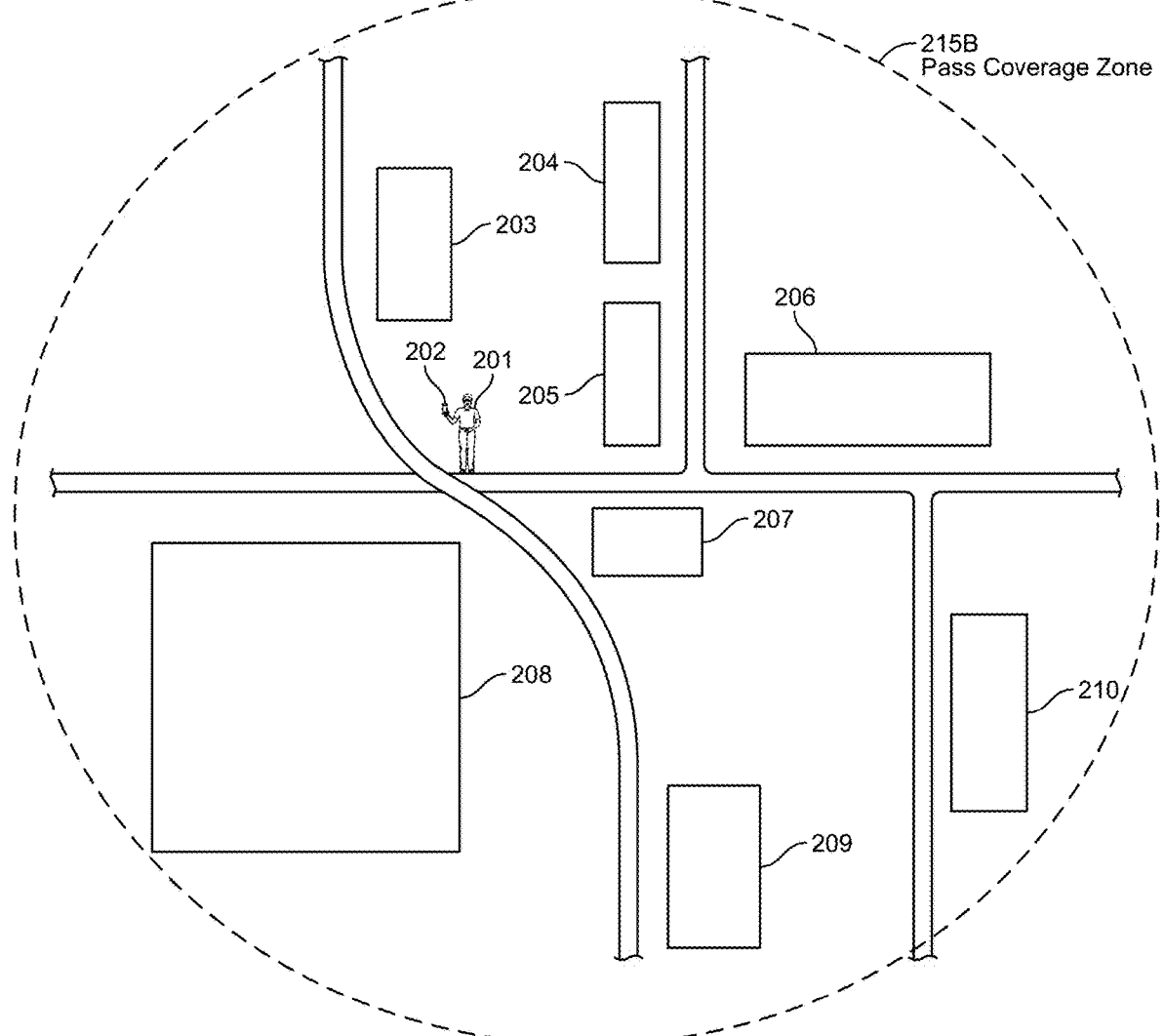

FIG. 2A, for instance, illustrates a map of an example location that may include various streets and buildings. In some cases, the map may represent an employer or government campus or other area in which a digital transportation pass may be used. In FIG. 2A, a user 201 may wish to travel between buildings 203-210. In the example scenario of FIG. 2A, the current pass coverage zone 215A illustrates an area within which user 201's digital transportation pass is valid. Accordingly, the user 201 may use their digital transportation pass to travel between any of buildings 203-208. In this scenario, the digital transportation pass may cover all types of transportation, including ridesharing vehicles, MMVs, PMVs, rental cars, public transportation, or other types of transportation.

In other cases, however, the various types of transportation may be limited by the entity to only ridesharing vehicles or to MMVs and rentals, for example. In this example scenario of FIG. 2A, the user 201 may use their mobile electronic device 202 to access the various types of transportation that are available between buildings 203-208 using their digital transportation pass. If the user 201 wishes to travel outside of the pass coverage zone 215A (e.g., to buildings 209 or 210), the user may need to cover at least some of the cost with either their own money or their own digital transportation pass that is not funded by the pass-issuing entity. At least in some cases, the entity issuing the digital transportation pass may control whether the digital transportation pass is valid beyond the pass coverage zone 215A and, if so, how far beyond it. In other cases, the digital transportation pass may only be valid for buildings or locations within the pass coverage zone 215A.

In some embodiments, the entity issuing the digital transportation pass may wish to enlarge the pass coverage zone. Thus, in FIG. 2B, the pass coverage zone 215B may be enlarged to cover not only buildings 203-208, but also buildings 209 and 210. This pass coverage zone 215B may be enlarged for a single user, for a group of users, or for all users, and may be enforced during a specific time of day or during specific time windows, on a specific day of the week, during a specified event, or based on other criteria. Accordingly, the pass coverage zone 215B may be dynamically changed by the entity or may be automatically changed upon meeting certain triggers or criteria.

Figure 2C:
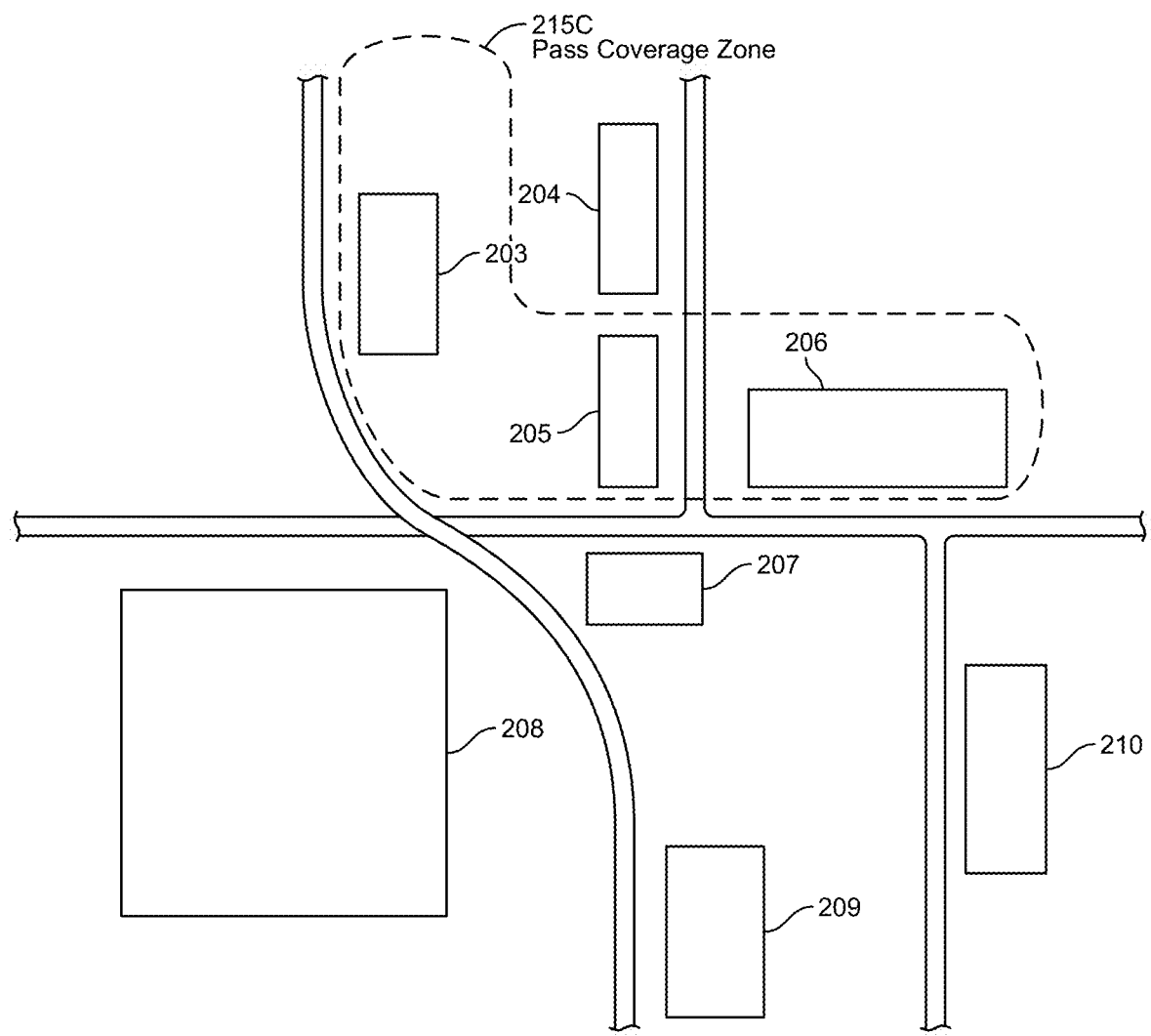

The pass coverage zone may be any shape or size and need not be circular. As shown in FIG. 2C, the pass coverage zone 215C may be substantially L-shaped and may contour to existing roads. Thus, in this example, the pass coverage zone 215C may be drawn to include certain buildings (e.g., 203, 205, and 206), while excluding other buildings (e.g., 204 and 207-210) or locations. As such, entities may have full control over which buildings or locations a given user may travel to using their digital transportation pass. In some cases, each individual digital transportation pass may have its own pass coverage zone. For instance, some users may be allowed to travel from building 203 to 206 using the entity-issued digital transportation pass, while other users may be able to travel between any of buildings 207-210, but not any other buildings. Thus, the digital transportation pass may be individualized to a single user. Other criteria and stipulations may also apply to each user individually. In other cases, the digital transportation pass redemption criteria may apply to certain groups of people (e.g., to a certain division within a company), or to all people, or to all people within a pass coverage zone. Furthermore, the redemption criteria may limit the validity of the digital transportation pass to certain times of day, days of the week, during specific events, determinations that the user has met certain eligibility criteria, etc.

Figure 2D:
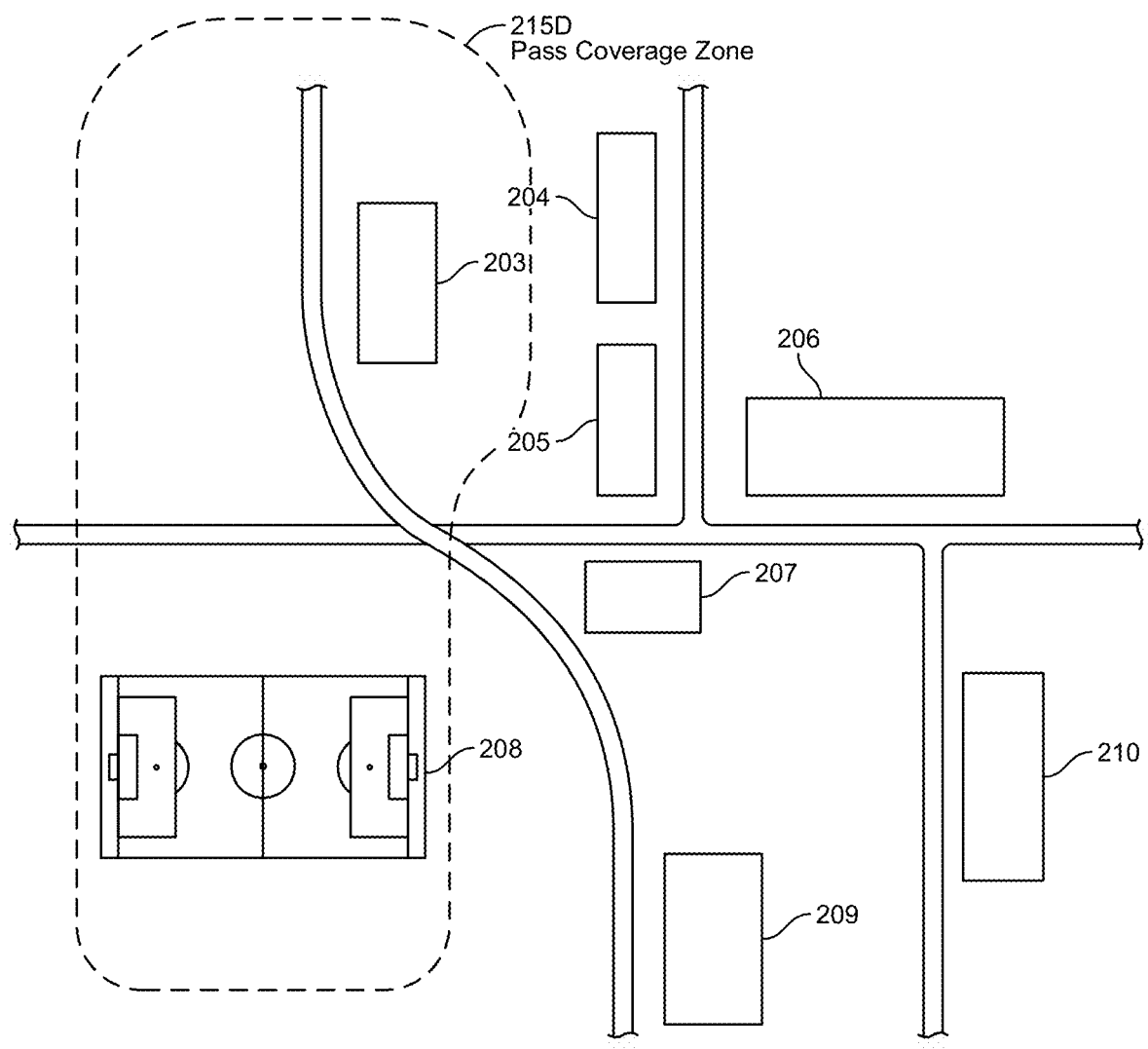

FIG. 2D illustrates an embodiment in which the pass coverage zone 215D encompasses a soccer field 208. In such cases, the pass coverage zone 215D may be valid from a certain time before the soccer game until a certain time after the game, and may include an area near the soccer field 208 (e.g., an area spanning three miles in each direction from the soccer field). The pass-issuing entity may specify which forms of transportation are available under the pass, and may specify which geographic areas the pass is valid in and when.

Figure 2E:
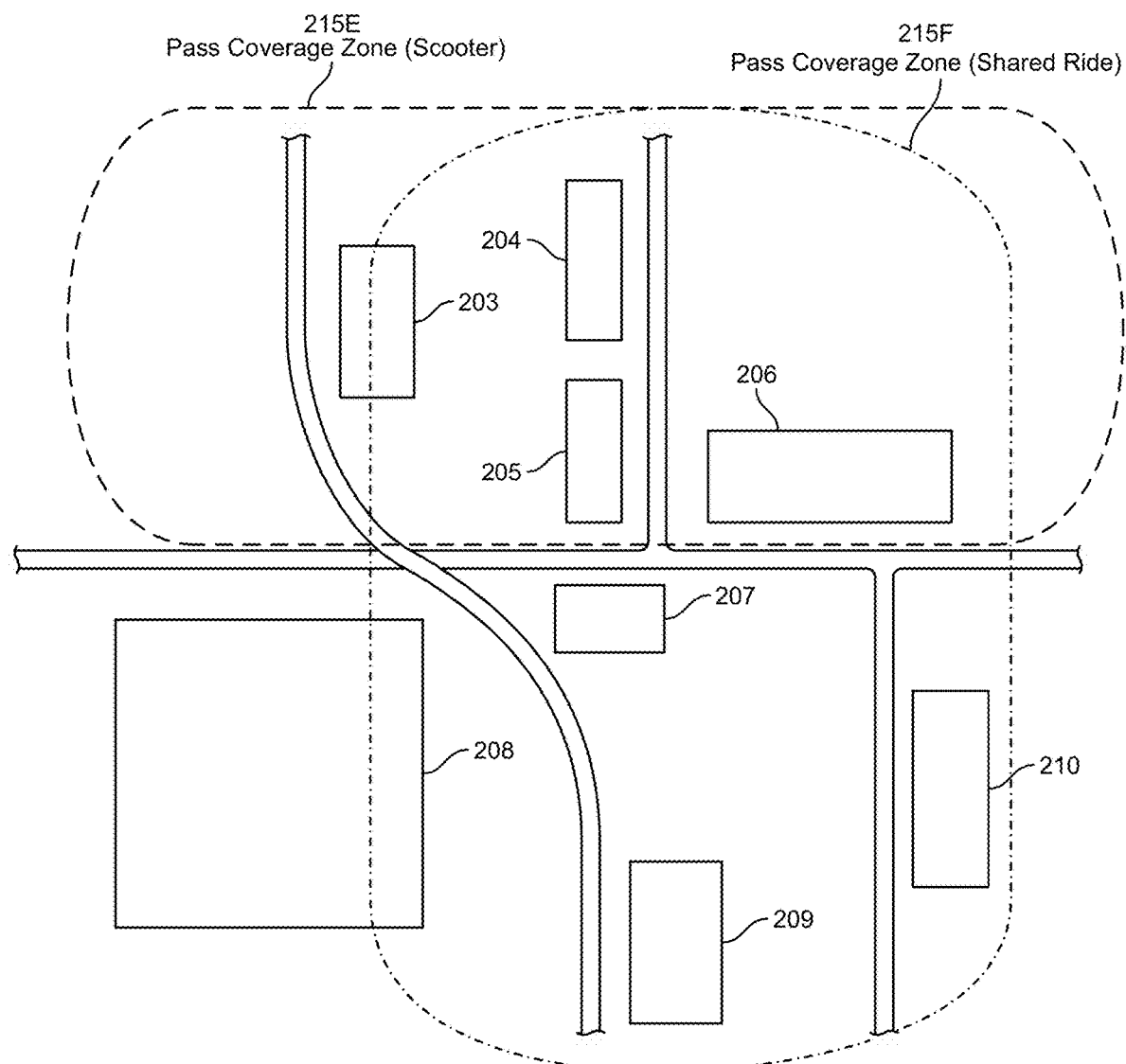

Additionally or alternatively, at least in some cases, the coverage of the digital transportation pass may depend on the type of transportation. Thus, as shown in FIG. 2E, a scooter may have its own pass coverage zone 215E, while a shared ride may have a separate pass coverage zone 215F. In some cases, the zones may overlap, while in other cases, the zones may be entirely separate. The pass-issuing entity may thus specify different pass coverage zones for MMVs, PMVs, public transportation, rental cars, or for other transportation modalities. Still further, other redemption criteria may also be used based on the time of day, events that are occurring, or who is attempting to use the pass. Thus, in at least one example, the pass coverage zones 215E (for scooter) and 215F (for ridesharing vehicles) may apply to one user, while different coverage zones may apply to different users, even within the same scooter and ridesharing vehicle modes of transportation. Accordingly, as can be seen in FIGS. 2A-2E, pass-issuing entities may have highly granular control over which users, which modes of transportation, and which times of day or days of the week are assigned certain pass coverage zones. Moreover, these pass coverage zones may be defined differently in different scenarios. In some cases, the pass coverage zones may be hand drawn to include certain locations while excluding others (e.g., similar to FIG. 2C). In still other cases, the pass coverage zone may be created to include non-contiguous areas or may be drawn in the shape of donuts with omitted areas in the middle. Each of these embodiments will be described further below with regard to the multi-modal transportation system 300 of FIG. 3

Figure 3:
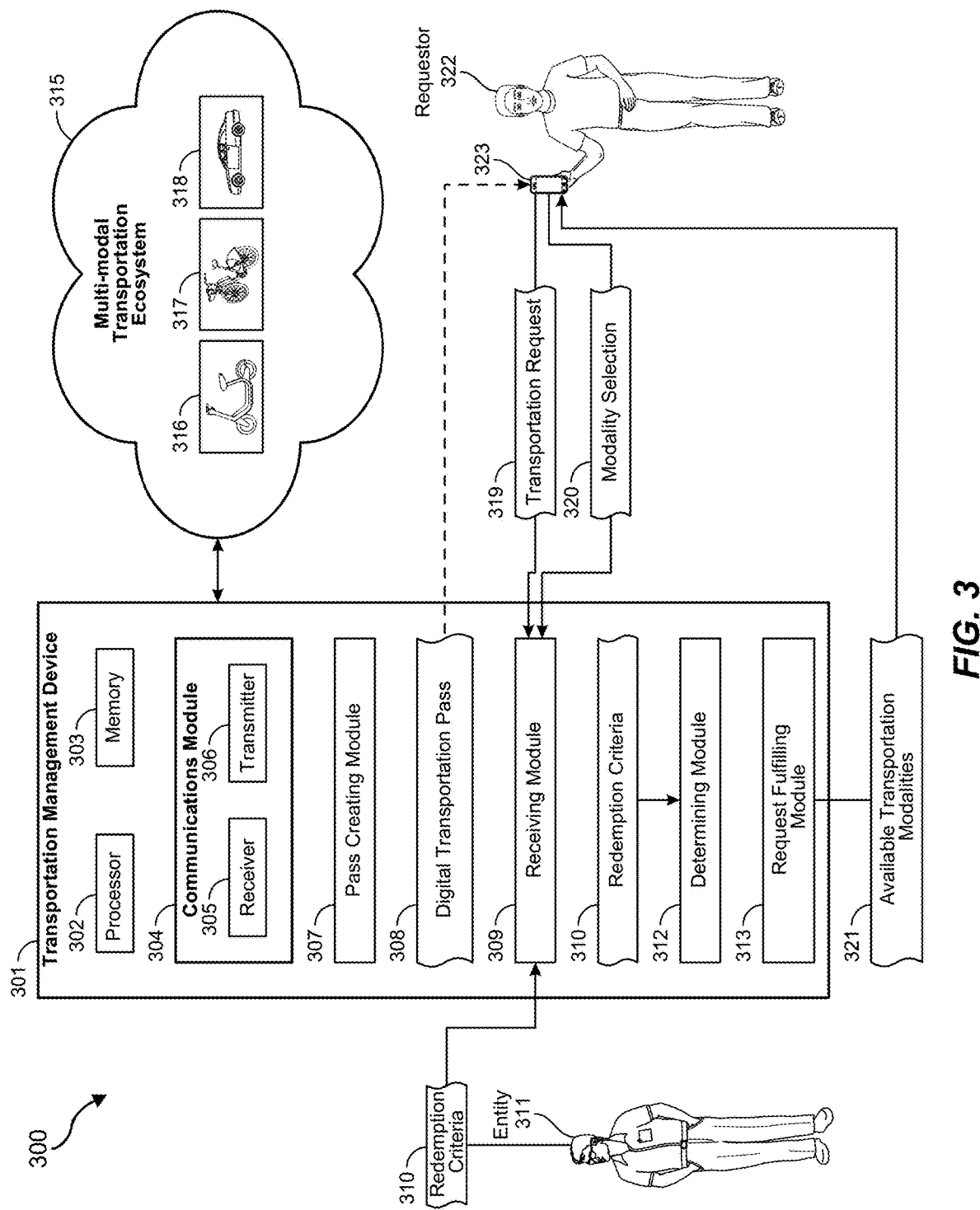
FIG. 3 is an illustration of an example architecture in which a digital transportation pass is generated and implemented.

FIG. 3 is an illustration of an example multi-modal transportation system 300 in which a digital transportation pass may be generated and implemented. As shown in FIG. 3, a transportation management device 301 may, via a variety of modules, create and specify various redemption criteria 310 for a digital transportation pass 308 that control how and when the digital transportation pass 308 may be redeemed, effectively creating a multi-modal transportation ecosystem 315. The transportation management device 301 may be substantially any type of computer system including a single, local computer system (e.g., a personal computer (PC) or a smartphone) or a distributed (e.g., cloud) computer system with multiple different nodes. The transportation management device 301 may include software modules, embedded hardware components such as hardware processors, or may include a combination of hardware and software.

In some cases, the transportation management device 301 may include at least one processor 302 and at least some system memory 303. The transportation management device 301 may include program modules for performing a variety of different functions. The program modules may be hardware-based, software-based, or may include a combination of hardware and software. Each program module may use computing hardware and/or software to perform specified functions, including those described herein below. The transportation management device 301 may also include a communications module 304 that is configured to communicate with other computer systems. The communications module 304 may include any wired or wireless communication means that can receive and/or transmit data to or from other computer systems. These communication means may include hardware interfaces including Ethernet adapters, WIFI adapters, and/or hardware radios including, for example, a hardware-based receiver 305, a hardware-based transmitter 306, or a combined hardware-based transceiver capable of both receiving and transmitting data. The radios may be cellular radios, Bluetooth radios, global positioning system (GPS) radios, or other types of radios. The communications module 304 may be configured to interact with databases, mobile computer devices (such as mobile phones or tablets), embedded systems, or other types of computer systems.

The transportation management device 301 may also include a pass creating module 307. The pass creating module 307 may be configured to create digital transportation passes that are valid and usable within the multi-modal transportation ecosystem 315. As noted above, the multi-modal transportation ecosystem 315 may include multiple different modes of transportation including scooters 316, bicycles 317 and other PMVs, ridesharing vehicles 318, rental vehicles, autonomous vehicles, public transportation options including buses, subways, and trains, and other modes of transportation. Any or all of these modes of transportation may be covered by the digital transportation pass 308 created by the pass creating module 307.

Once created, the digital transportation pass 308 may be transmitted electronically to a user (e.g., 322) or, more specifically, to an electronic device 323 associated with the user. The electronic device may be a mobile device (e.g., a smartphone or smartwatch) or a stationary device such as a personal computer (PC). In some cases, the digital transportation pass 308 may be transmitted to the users' electronic devices through an application. In other cases, the digital transportation pass 308 may be transmitted as an enrollment code through email, phone number, text message, or other means of electronic distribution. For instance, an institution such as a university may send out an email to all those persons (or a subset thereof) that have a university email account (e.g., students, staff, professors). That email may include an enrollment code that may be used within a transportation requesting application or at a website to access the digital pass.

After receiving such an enrollment code, the user may activate or use the enrollment code to have the digital transportation pass 308 formally associated with their email address and/or their account within the multi-modal transportation ecosystem 315. In some cases, the user may click on the enrollment code to activate a link associated with the code, or the user may cut and paste the code into a website or application to activate the digital pass, or the user may take some other action to enroll themselves (or their associated electronic devices) with the multi-modal transportation ecosystem 315. Once the user is enrolled and the digital transportation pass 308 has been activated, the user may then be able to request transportation using the digital transportation pass 308. This enrollment process may include creating a new user account within the multi-modal transportation ecosystem 315, or may include linking a user's existing user account within the ecosystem to the transmitted digital transportation pass 308.

The receiving module 309 of transportation management device 301 may receive various requests and different types of data including redemption criteria 310. In some cases, for example, an entity 311 (e.g., an employer, a government entity, a university or high school, a social group, etc.) may specify redemption criteria 310 under which the digital transportation pass 308 is valid. These criteria may initially be sent with the digital transportation pass 308 to the user's mobile device 323 and may later be updated with new or different redemption criteria 310. As the term is used herein, "redemption criteria" may refer to any stipulations, specifications, rules, or limits governing when, where, and how the digital transportation pass 308 may be used to request and receive transportation from one location to another. While pass-issuing entities may create and apply substantially any type of redemption criteria 310, a few non-limiting examples include the duration of the pass (e.g., start and end dates, such as for a specified school year), the type of benefit offered by the pass (e.g., monetary credit, number of permitted rides, type of rides permitted, etc.), time-of-day limits (e.g., weekdays only), distance limits (e.g., within a specified radius or custom geofence), origin/destination limits (e.g., to or from work only), transportation modality limits (e.g., shared rides only), ride frequency limits, or other limits on use. The pass-issuing entity 311 may also specify whether the pass will expire (e.g., as a one-time pass) or will renew (e.g., on a monthly basis). The receiving module 309 may also be configured to receive transportation requests 319 from users (e.g., 322), along with indications of which transportation modality 320 they wish to use to get from one location to another.

The transportation management device 301 may further include a determining module 312. The determining module 312 may be configured to determine whether the redemption criteria 310 have been met for a given user, at a given time, and/or at a given location, depending on which single criterion or criteria are specified at that moment. If the redemption criteria are met (e.g., the user's location is within the pass coverage zone 215A of FIG. 2A), then the request fulfilling module 313 of the transportation management device may send an indication of available transportation modalities 321 to the requestor 322, whereupon the requestor 322 may select which transportation modality 320 they plan to use, as covered by the digital transportation pass 308. These embodiments are further described below with regard to method 400 of FIG. 4 and FIGS. 5-14.

Figure 4:
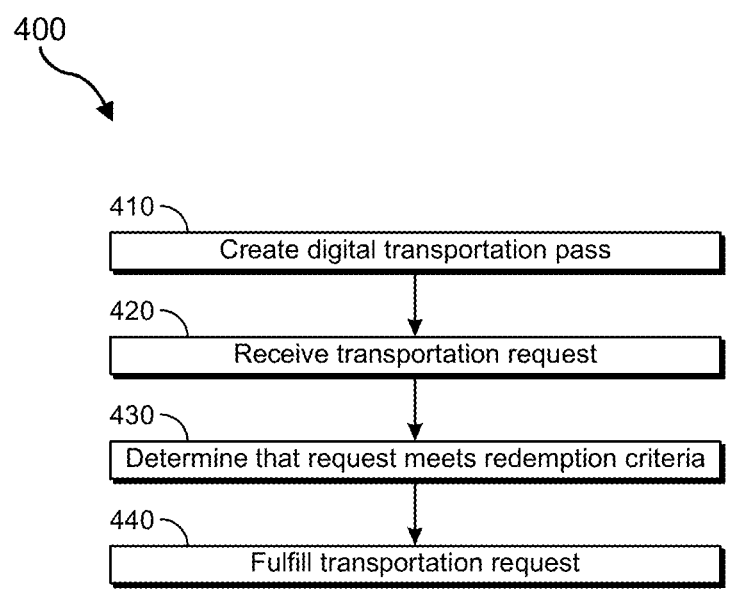
FIG. 4 is a flow diagram of an example method for generating and implementing a digital transportation pass.

FIG. 4 is a flow diagram of an exemplary computer-implemented method 400 for creating and implementing a digital transportation pass. The steps shown in FIG. 4 may be performed by any suitable computer-executable code and/or computing system, including the system illustrated in FIG. 3. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may create, via a transportation management device that manages a multi-modal transportation ecosystem for an entity, a digital transportation pass for the entity that allows transportation requestor devices to request transportation via the digital transportation pass. At step 420, the systems described herein may receive, at the transportation management device, a transportation request from a transportation requestor device. At step 430, the systems described herein may determine, at the transportation management device, that the transportation request satisfies one or more redemption criteria, defined by the entity, for redeeming the digital transportation pass and may fulfill, at step 440, the transportation request in response to determining that the transportation request satisfies the redemption criteria.

Figure 5:
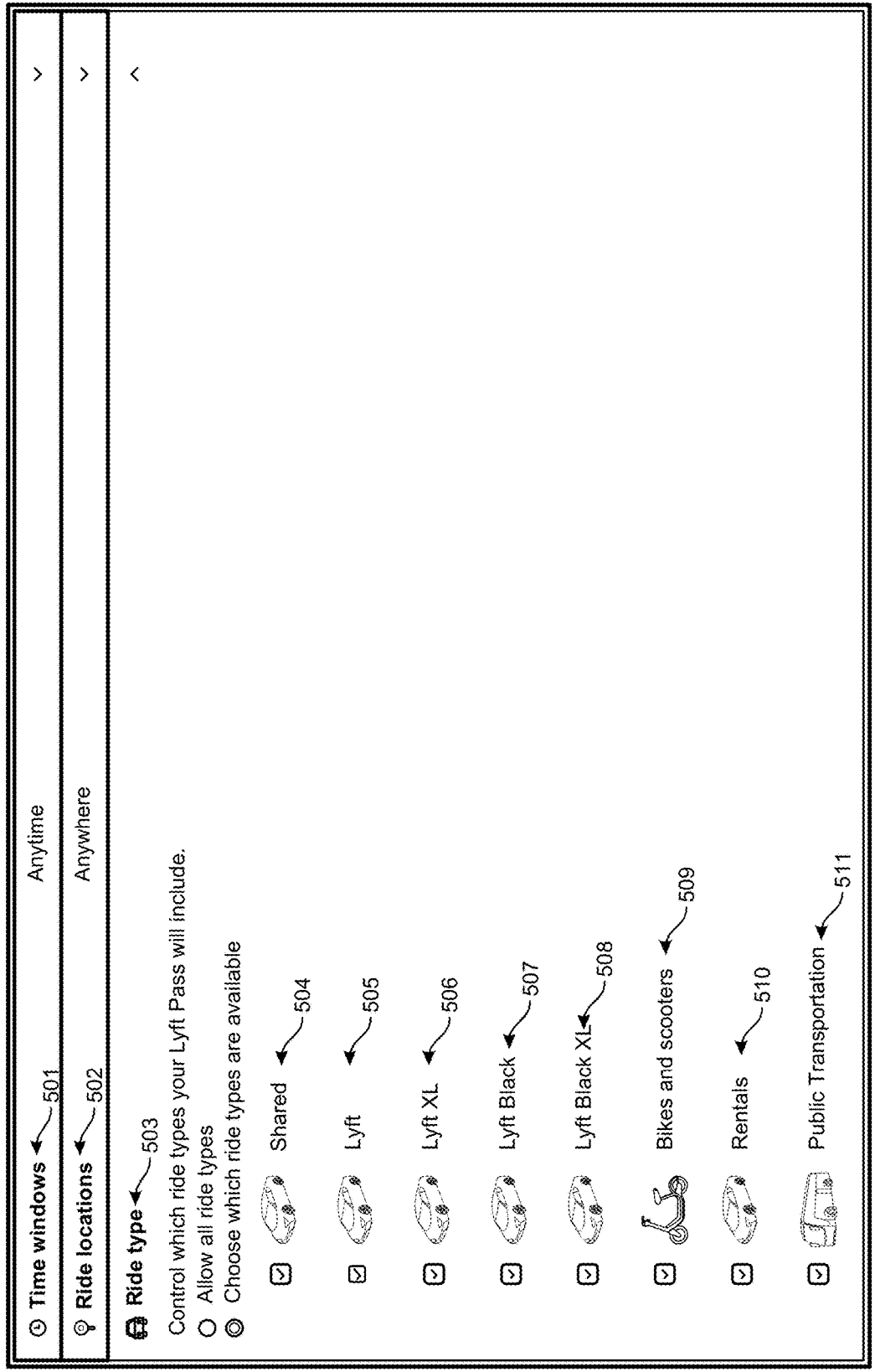
FIG. 5 illustrates an example user interface in which multiple transportation modalities are presented for selection.

FIG. 5 illustrates an embodiment of a user interface 500 that allows entities to define which transportation modalities are available to transportation requestors. For example, an entity may allow a transportation requestor to use a digital transportation pass created in step 410 of method 400 to request transportation via one or more of the ride types shown in the user interface 500. For instance, within the various ride types of the ride type window 503, the entity may select which options are available to transportation requestor 322 of FIG. 3. These options may include a shared ride 504, an individual ride 505, an individual ride with an extra-large vehicle 506, an individual ride in an upscale vehicle 507, an individual ride in an extra-large upscale vehicle 508, a scooter or bicycle 509, a rental vehicle 510, or at least one form of public transportation 511. Other transportation options may also be presented in the ride type window 503 of user interface 500.

In some cases, the user interface 500 may be configured to only show those transportation modalities that are currently available for certain transportation requestors or groups of requestors. For instance, some transportation modalities may not be available in certain locations or at certain times of day. Thus, the entity may define redemption criteria for the digital transportation pass, indicating that only scooters and bicycles 509, for example, are selectable as an option, or that only public transportation 511 is an option at a specific time of day. On a different day or time, or at a different location, the entity may select different transportation modalities (e.g., 504-511) that may then be presented to transportation requestors on their electronic devices (e.g., 323). Other windows or screens may also be presented within the user interface 500 including a time window screen 501 that allows entities to specify time windows within which they will cover transportation via the digital transportation pass. The user interface 500 may also provide a ride locations window 502 that allows entities to filter out or refine those pickup or destination locations that are covered by the digital transportation pass. Accordingly, the user interface 500 may be customized and refined to show those options that are to be presented to transportation requestors in different circumstances, and may further allow entities to specify redemption criteria for each specific transportation modality that is covered by that entity's digital transportation pass.

Once a transportation requestor has seen their available options in a transportation requesting application on their electronic device and has selected their preferred option, the request fulfilling module 313 of FIG. 3 may fulfill the transportation request by providing the transportation requestor device access to the selected transportation modality or modalities. For example, the request fulfilling module 313 may indicate that a specific scooter is ready for riding using the digital transportation pass and may indicate the location of the scooter. Or, the request fulfilling module 313 may indicate that a shared ride is on its way to a specified location and that the transportation requestor is to walk to the specified location for pickup and transportation using the digital transportation pass. Many other options may also be available, depending on which redemption criteria have been met.

In some cases, determining that a given transportation request (e.g., 319 of FIG. 3) satisfies one or more redemption criteria 310 may include determining that the transportation requestor device 323 is located within the multi-modal transportation ecosystem 315. In such cases, the redemption criteria may specify geographical boundaries within which the digital transportation pass 308 is valid (at least via some transportation modalities). As long as the transportation requestor requests locations within those geographical boundaries (e.g., within pass coverage zone 215A of FIG. 2A), the digital transportation pass may provide transportation covered by the pass-issuing entity 311. In other cases, determining that the redemption criteria 310 have been met may include determining that the transportation request was received at a specified time of day. This time of day criterion may build on the geographic location criterion or may be its own criterion. In cases where time of day is the sole redemption criterion, the transportation requestor may access the various transportation modalities covered by the digital transportation pass 308 within the specified time window. In cases where both location and time redemption criteria apply, the transportation would need to be both within the specified geographic boundaries and within the specified time window for the transportation to be covered by the digital transportation pass 308.

Other redemption criteria 310 may also be applied, either by themselves or in combination with other redemption criteria. Thus, the determining module 312 may determine that the transportation request 319 was received on a specified day of the week, or that the transportation request was received during a specified event, or that the transportation request identifies a specified pickup location, or that the transportation request identifies a specified drop-off location, or that the transportation request identifies a specific transportation modality, etc. As noted above, the pass-issuing entity 311 may have full control to create new redemption criteria 310 that apply to select individuals, to groups of people, or to all pass users under their control. The pass-issuing entity 311 may also update or modify existing redemption criteria 310, or may remove existing criteria for certain individuals, for certain groups, or for all digital transportation pass users (e.g., if roles change at a company and an employee moves into a role that involves less travel). Accordingly, pass-issuing entities may have the ability to create, modify, update, or remove redemption criteria for the multi-modal transportation ecosystem 315. In cases where a pass-issuing entity 311 controls multiple different ecosystems (e.g., an employer that has campuses in different locations around the world), the entity may manage each ecosystem differently depending on local circumstances and local availability of the different transportation modalities.

In some case, the digital transportation pass 308 may enable an entity (e.g., 311) to specify geographical boundaries within which the digital transportation pass 308 is valid. This may be performed in a variety of ways. For example, the entity 311 may specify a center point location and a radius out from which the digital transportation pass is valid. Thus, for example, the entity 311 may specify a certain point on their campus and then indicate, in the redemption criteria 310, that the digital transportation pass 308 is valid anywhere within a one-mile radius, or within a five-mile radius, or within a 10-mile radius, etc. In other cases, the entity 311 may draw the pass coverage zone boundaries on a map. As shown in FIG. 2D, for instance, the pass coverage zone 215D may be drawn to include buildings 203 and 208, while excluding other buildings and locations. In such cases, the entity 311 may draw the boundaries in substantially any manner, shape, size, or configuration they desire, potentially with cutouts or pockets within which the digital transportation pass 308 would not work, even though those pockets are generally within the boundaries drawn by the entity. In cases where geographical boundaries are established for a digital transportation pass 308, those boundaries may be redrawn or redesigned at substantially any point in time and may be updated via a software-based redemption criteria update that is transmitted to each user's mobile device.

Figure 6:
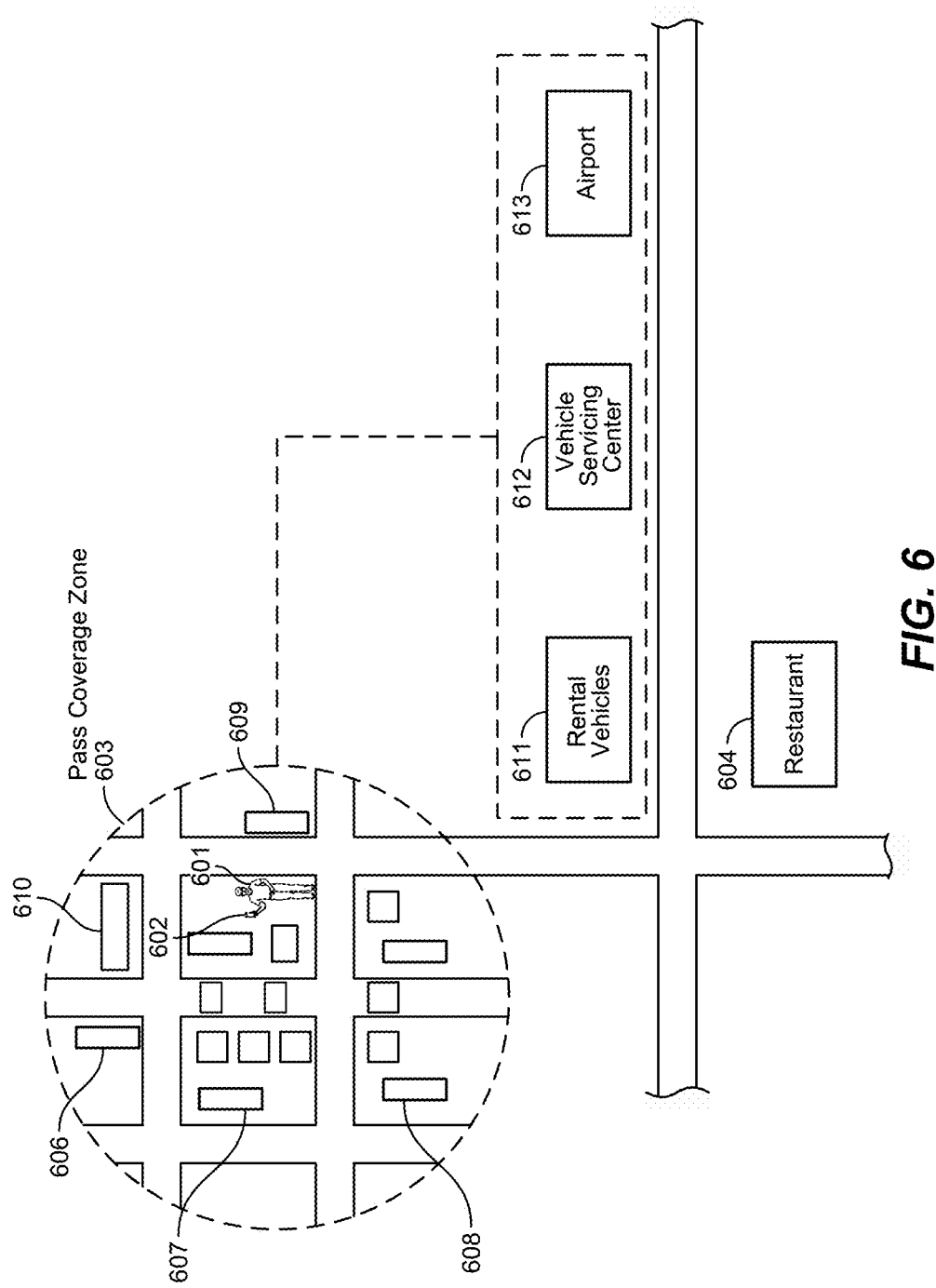
FIG. 6 illustrates an example scenario in which a coverage zone for a digital transportation pass is extended based on settings or criteria.

In some cases, a transportation requestor may request transportation that either begins within a pass coverage zone and ends outside the zone, or begins outside the zone and ends within the pass coverage zone. In such cases, the transportation request may be said to initially satisfy at least one of the redemption criteria 310 (e.g., pickup location is within the pass coverage zone), but may fail to satisfy at least one other redemption criteria (e.g., drop-off location is within the pass coverage zone). In these cases, the request fulfilling module 313 of FIG. 3 may at least partially fulfill the transportation request using the digital transportation pass, and may at least partially fulfill the transportation request using another form of value (e.g., personal money belonging to the requestor). For example, as shown in FIG. 6, a transportation requestor 601 may be located within a pass coverage zone 603 that specifies a geographical boundary within which a digital transportation pass is valid. This geographical boundary may cover buildings 602 and 606-610 and, in some cases, may be extended to include a rental vehicle outlet 611, a vehicle service center 612, an airport 613, or other locations. The digital transportation pass (e.g., 308) does not (at least in this example) cover restaurant 604. Thus, if the transportation requestor 601 requested transportation from building 607 to restaurant 604, the redemption criterion of being located within the pass coverage zone 603 would be met, but the redemption criterion of traveling to a location within the pass coverage zone 603 would not be met.

In such cases, the request fulfilling module 313 of FIG. 3 may be configured to cover the cost of the requested transportation from the requestor's current location up to the end of the pass coverage zone 603 via the digital transportation pass 308, and may cover the remaining portion of the cost (e.g., from the boundary of the pass coverage zone 603 to the restaurant 604 in this example) using a stored form of currency such as a debit card or credit card, or a personal digital transportation pass associated with the requestor. Thus, in cases where a portion of the redemption criteria is met (e.g., the requestor is requesting transportation within a pass coverage zone), but is requesting a mode of transportation that is not covered by that pass-issuing entity, or is requesting transportation to an event not covered by the entity, etc., the request fulfilling module 313 may cover some portion of the transportation using the digital transportation pass 308, and may send some portion of the costs on to the requestor 601. The requestor may then pay their portion using a credit card, a debit card, a digital wallet holding a cryptocurrency, a personal transportation pass not tied to the controlling entity, or using some other form of payment.

In these cases, the pass-issuing entity 311 may have full control over whether these partially conforming transportation requests are covered by the digital transportation pass 308 and how much of the transportation costs will be covered. Again, this may be applied on an individual basis (e.g., individuals that have paid for or qualified for higher-tier service), on a group basis (e.g., some groups or divisions of people may have legitimate needs to request transportation outside of established redemption criteria based on their role at a company, for example), or may be applied equally to all transportation requestors. Accordingly, in this manner, entities may specify how requests are handled that meet some redemption criteria, but do not meet other criteria. Moreover, this may ensure that a transportation requestor still has at least some transportation options available, even if some redemption criteria 310 are not fully met in their request.

In some embodiments, fulfilling a transportation request may include identifying a location where rental vehicles are available for pickup through the digital transportation pass.

As noted in FIG. 6, a rental vehicle outlet 611 may be located outside of the pass coverage zone 603. However, the redemption may allow for a transportation requestor to request and receive transportation from within the pass coverage zone 603 (or, in some cases, from outside of the pass coverage zone) to the location of the rental vehicle outlet 611. From there, the transportation requestor may rent a vehicle that, itself, may be covered under the digital transportation pass 308. Thus, at least in some cases, a digital transportation pass 308 may include transportation to the rental vehicle outlet 611 and may also include travel within the rental vehicle. In some cases, limitations on distance or total mileage (or other redemption criteria) may be placed on the transportation requestor if they wish to remain covered under the digital transportation pass 308. The user may use the various user interfaces described below with relation to FIGS. 7A-9E to make the initial request and follow through to pickup of the rental vehicle.

Additionally or alternatively, a transportation requestor may request vehicle maintenance services that are accessible through the digital transportation pass 308. For example, the transportation requestor may send a request for vehicle maintenance services to the transportation management device 301. The request fulfilling module 313 of the transportation management device 301 may then perform one or more steps including determining an initial location of a vehicle associated with the transportation requestor 601 or with the transportation requestor's device. The request fulfilling module 313 may then dispatch an entity (e.g., a vehicle servicing center employee) to transport the requestor's vehicle to the automated vehicle servicing center 612. Then, upon completion of the requested vehicle maintenance services, the request fulfilling module 313 may dispatch the employee to transport the vehicle back to the initial location. In this manner, a transportation requestor may simply request that their vehicle be serviced, and the multi-modal transportation ecosystem may ensure that the requestor's vehicle is picked up from its current location, taken to a vehicle servicing center (e.g., 612 of FIG. 6 or 1000a of FIG. 10), and serviced according to the requestor's specifications. Then, the vehicle may be returned to the original location and the transportation requestor will have a fully serviced vehicle without using any time of their own. Systems and interfaces for making and following through with such requests are described in FIGS. 10-11E.

In other cases, a transportation requestor may request that vehicle maintenance be performed where the vehicle is currently located (e.g., at a parking lot). In these cases, fulfilling the request for vehicle maintenance services may include determining the current location of the requestor's vehicle and then dispatching a vehicle maintenance technician to perform the requested vehicle maintenance services at the vehicle's current location. As such, a requestor may implement the digital transportation pass 308 to request not only transportation from location to location, but may also request access to rental cars and vehicle servicing, any or all of which may be covered by the digital transportation pass 308.

In some cases, these rental, ridesharing, vehicle servicing, and other services may have custom codes associated with them. The custom codes may be unique, auto-generated codes that can be scanned and implemented by the digital transportation pass 308 (and the multi-modal ecosystem 315) to provide the transportation, rental, or vehicle maintenance services. In other cases, these custom codes may be used to share digital transportation passes among users including students, employees, government workers, or other users. These custom codes (e.g., "BUSINESSTEAM") may be sent out to individual users by email, text, via a website, or within an application. Users may claim the custom codes to at least temporarily access the various services provided by the multi-modal transportation ecosystem. In some cases, for instance, all company-associated email accounts may be permitted to redeem and use the company's digital transportation pass using their company-issued email address. Other codes may be used for single-use rides or single-use rentals or vehicle maintenance services. Accordingly, pass-issuing entities may use custom codes to provide different ongoing or temporary, single-use services within the multi-modal transportation ecosystem 315.

In accordance with one or more embodiments, FIGS. 7A-9E provide examples of various graphical user interfaces comprising interactive elements for reserving a rental vehicle. As mentioned, the multi-modal transportation system 300 may offer a variety of transportation options via the above-described digital transportation pass. In the examples illustrated in FIGS. 7A-9E, multi-modal transportation system 300 may present (or cause a requestor device 323 to present) a multi-modal graphical user interface comprising at least a rental route and a provider transportation route to a requestor 322 on an electronic device such as mobile device 701. Specifically, FIGS. 7A-7B illustrate example embodiments of graphical user interfaces comprising a rental route and provider transportation routes in parallel on the requestor device 323. FIGS. 8A-8D illustrate example embodiments of graphical user interfaces comprising interactive elements for reserving a rental vehicle. FIGS. 9A-9E illustrate example embodiments of graphical user interfaces comprising various intermediate transportation options.

As an overview, FIGS. 7A-9E each depict the requestor device 323 executing a requestor application for the dynamic transportation matching system described above. In some embodiments, the requestor application comprises computer-executable instructions that (upon execution) cause the requestor device 323 to perform certain actions and present interactive elements depicted in FIGS. 7A-9E. Based on receiving route data from the multi-modal transportation system 300, in some embodiments, the requestor device 323 executes instructions from the requestor application and presents the graphical user interfaces shown in FIGS. 7A-9E.

FIGS. 7A-7B illustrate an example multi-modal graphical user interface 704 displayed on a screen of the requestor device 323. For instance, FIG. 7A illustrates the requestor device 323 presenting the multi-modal graphical user interface 704 including a rental vehicle option and a provider-matching option. FIG. 7B illustrates a vehicle selection user interface 720 including various rental vehicle options.

In this example, the multi-modal transportation system 300 presents, at the requestor device 323, the multi-modal graphical user interface 704 including a provider transportation route and a rental route. As illustrated in FIG. 7A, the multi-modal graphical user interface 704 includes a map element 706, provider matching transportation options 716a-716b (collectively "provider transportation options 716"), and a rental vehicle option 718. As shown in FIG. 7A, the requestor device 323 presents the multi-modal graphical user interface 704 and includes the map element 706. As illustrated, the map element 706 depicts an overview of a selected transportation option—whether that be a provider-matching option or a rental vehicle option. As illustrated in FIG. 7A, the map element 706 depicts an overview of the selected rental vehicle option 718, as indicated by a box around the rental vehicle option 718. The requestor device 323 presents, within the map element 706, a requestor icon 752 indicating the current location of the requestor, a rental vehicle location icon 740 indicating the rental vehicle location, and a destination location icon 750.

As further indicated by FIG. 7A, the requestor device 323 presents the multi-modal graphical user interface 704 including a rental routes element 710, a comparison element 712, and a provider transportation routes element 714. As illustrated, based on receiving an indication of requestor interaction (e.g., selection) with the comparison element 712 from the requestor device 323, the multi-modal transportation system 300 sends data for routes or options to the requestor device 323—to cause the requestor device 323 to present both provider and rental vehicle routes or options. Based on the data, the requestor device 323 presents various transportation options with routes by which a vehicle can transport a requestor 322 to the destination location. Based on requestor interaction with the rental routes element 710, on the one hand, the requestor device 323 presents rental routes, but not provider transportation routes. Based on requestor interaction with the provider transportation routes element 714, on the other hand, the requestor device 323 presents provider transportation routes, but not rental routes.

As mentioned above, the requestor device 323 presents both a provider transportation route and a rental route based on selection of the comparison element 712. As illustrated in FIG. 7A, the requestor device 323 presents the provider-matching transportation options 716 and the rental vehicle option 718. The requestor device 323 can visually indicate a selection of one of the transportation options. As illustrated in FIG. 7A, for instance, the requestor device 323 detects requestor interaction with the rental vehicle option 718 corresponding to a rental route. Based on the requestor interaction, the requestor device 323 visually indicates (e.g., generates a highlight box surrounding) the rental vehicle option 718. The rental vehicle option includes details concerning a rental vehicle and corresponding travel, such as the number of available seats (e.g., 5), the rental vehicle rate ($64.20), and an estimated time of arrival at the destination location.

As illustrated in FIG. 7A, the provider-matching transportation option 716a corresponds to a provider transportation route involving a sedan-sized provider vehicle. The provider-matching transportation option 716a includes provider-matching transportation route information, including the number of available seats (e.g., 4), the provider-vehicle rate for the sedan-sized provider vehicle (e.g., $10.62), and the estimated time of arrival at the destination location (e.g., 10:10 A M). Similarly, the provider-matching transportation option 716b includes provider matching transportation route information corresponding to an alternative provider-vehicle route involving a larger (e.g., SUV) provider vehicle. As illustrated, the provider-matching transportation option 716b indicates the number of available seats, the rate, and the estimated time of arrival at the destination location. Based on requestor interaction with the provider-matching transportation options 716, the requestor device 323 updates the graphical user interface to present additional details regarding the corresponding provider transportation route.

The multi-modal graphical user interface 704 also includes a payment options element 728. Based on requestor selection of the payment options element 728, the requestor device 323 updates the graphical user interface to provide additional details regarding potential payment options. The requestor 322 may input alternative payment option or otherwise manage payment options.

Based on receiving indications of user selection of the scheduling element 724, the multi-modal transportation system 300 may determine and schedule transportation routes for the future. For example, the multi-modal transportation system 300 may identify a future date for a provider transportation route or a rental route based on user input.

As illustrated in FIG. 7A, based on detecting user selection of the selection element 726, the requestor device 323 updates the multi-modal graphical user interface 704 to provide additional details regarding the selected transportation option. For example, as illustrated, the requestor device 323 detects user interaction with the rental vehicle option 718. Based on an additional requestor selection of the selection element 726, the requestor device 323 presents additional detail regarding the rental vehicle option 718.

As previously mentioned, based on user interaction with the rental routes element 710, the comparison element 712, or the provider transportation routes element 714, the multi-modal transportation system 300 presents additional transportation route options corresponding to the selected element. FIG. 7B illustrates an example vehicle selection user interface 720 on the screen of the requestor device 323 based on the multi-modal transportation system 300 detecting requestor selection of the rental routes element 710.

As illustrated in FIG. 7B, the requestor device 323 presents, within the vehicle selection user interface 720, a rental map element 708, a first rental vehicle option 730, and a first rental vehicle option selection element 734. The requestor device 323 presents the rental map element 708, which includes the rental vehicle location icons 740a and 740b. Each of the rental vehicle location icons 740a and 740b indicate a rental vehicle location. The requestor device 323 presents the rental vehicle location icons 740a and 740b to generally indicate the nearest rental vehicle location. Based on detecting requestor selection of one of the rental vehicle location icons 740a or 740b, the requestor device 323 updates the vehicle selection user interface 720 to indicate available rental vehicles that are located at the selected rental vehicle location.

As further illustrated by FIG. 7B, the multi-modal transportation system 300 presents, via the vehicle selection user interface 720, the first rental vehicle option 730. The first rental vehicle option 730 indicates a particular available rental vehicle along with the corresponding rental vehicle location. For example, as indicated by the first rental vehicle option 730, the rental vehicle is located at the Mission rental vehicle location of the address 321 Florida St, which is three miles away from the requestor's current location.

Additionally, the first rental vehicle option 730 indicates characteristics of the particular available rental vehicle. For example, the requestor device 323 presents the make and model (e.g., VW Passat), number of seats (e.g., 5), mileage (25/36), and estimated rental vehicle rate ($55/day). Although FIG. 7B illustrates the rental vehicle rate as the rental vehicle daily rate, in one or more embodiments, the multi-modal transportation system 300 may also present a predicted total rental vehicle rate which includes an estimated intermediate rate.

The requestor device 323 also presents a second rental vehicle option 736 via the vehicle selection user interface 720. Although FIG. 7B illustrates the inclusion of a first and a second rental vehicle options, the requestor device 323 can present multiple rental vehicle options via the vehicle selection user interface 720.

As illustrated, the vehicle selection user interface 720 includes route-option elements 738. The route-option elements 738 may include a number of selectable icons (e.g., a magnifying glass, a bicycle, a train, and keys), and the requestor device 323 updates the vehicle selection user interface 720 to present information regarding the selected icon. In one embodiment, the multi-modal transportation system 300 transmits information regarding various other transportation options to the destination location based on detected selection of the corresponding selected icon. For example, the requestor device 323 may present a bikeshare transportation route in response to user selection of the bicycle icon. Similarly, the requestor device 323 updates the vehicle selection user interface 720 to present public transit route options and rental route options based on a user selection of the train icon and the bicycle icon, respectively. Based on a detected selection of the magnifying glass icon, the multi-modal transportation system 300 may update the destination location. Though not illustrated, the route-option elements 738 may include additional selectable icons including icons corresponding to a provider-vehicle route, a scooter share route, a taxi route, and any other transportation route determined by the multi-modal transportation system 300.

As described, FIG. 7B illustrates the vehicle selection user interface 720 as an example interface presented by the requestor device 323 after the multi-modal transportation system 300 has received a transportation request. In at least one embodiment, the requestor device 323 presents the vehicle selection user interface 720 without receiving a transportation request. For example, the multi-modal transportation system 300 presents various transportation options near the requestor 322. The multi-modal transportation system 300 presents various transportation options based on selection of icons in the route-option elements 738. In addition to presenting rental vehicle options, the multi-modal transportation system 300 may provide data for bikeshare options, public transportation options, and provider-matching options to the requestor device 323 based on selection of the corresponding selectable icon. Additionally, based on detecting interaction with the magnifying glass selectable icon, the requestor device 323 receives an input destination location from the requestor.

FIGS. 7A-7B illustrate example graphical user interfaces presenting rental vehicle options corresponding to predicted rental parameters. Based on detecting selection of the first rental vehicle option selection element 734, the requestor device 323 updates the graphical user interface to present interactive elements for adjusting rental parameters.

As mentioned previously in relation to FIG. 3, the multi-modal transportation system 300 generates predicted rental parameters to transmit data for the provider transportation route and the rental route. The multi-modal graphical user interface 704 and the vehicle selection user interface 720 illustrated in FIGS. 7A-7B include transportation route information determined by the multi-modal transportation system 300 using the predicted rental parameters. As further discussed in relation to FIG. 3, the multi-modal transportation system 300 may generate, request, or modify rental parameters based on requestor input. FIGS. 8A-8D illustrate a series of example graphical user interfaces by which the requestor device 323 may receive the input of requestor modifications and present the requestor modifications for confirmation by the requestor 322.

Figure 8B:
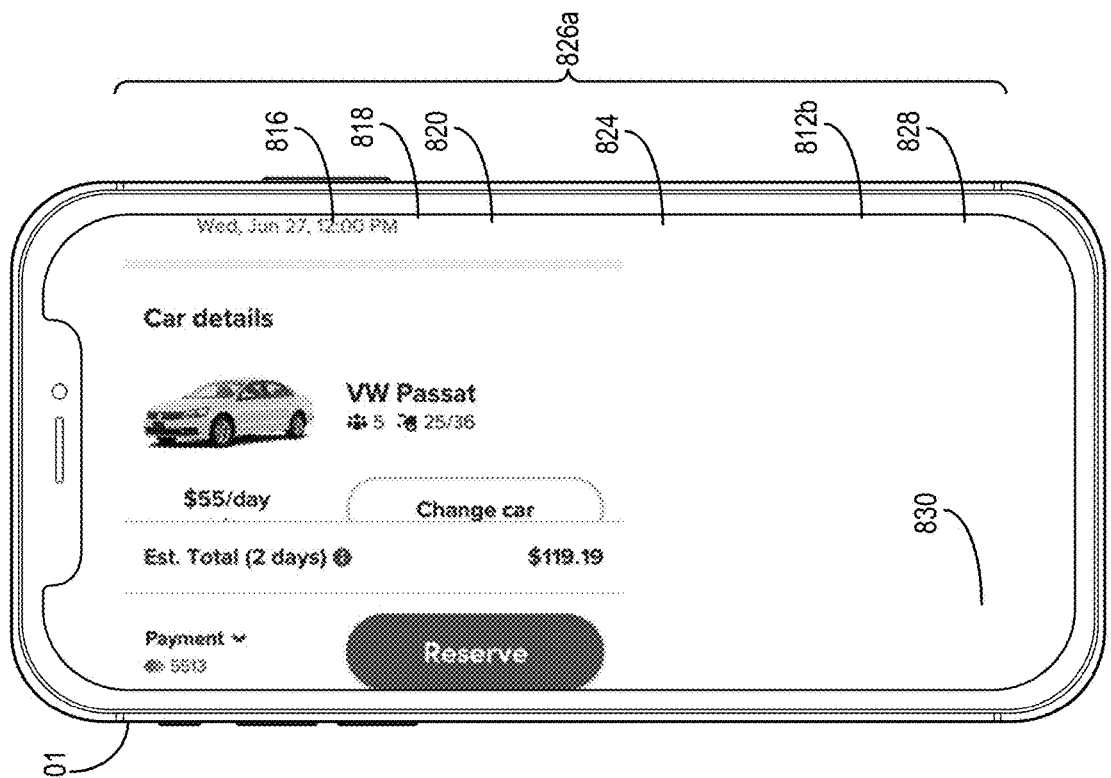
FIGS. 8A-8D illustrate graphical user interfaces for receiving requestor-modified rental parameters in accordance with one or more embodiments.
Figure 8A:
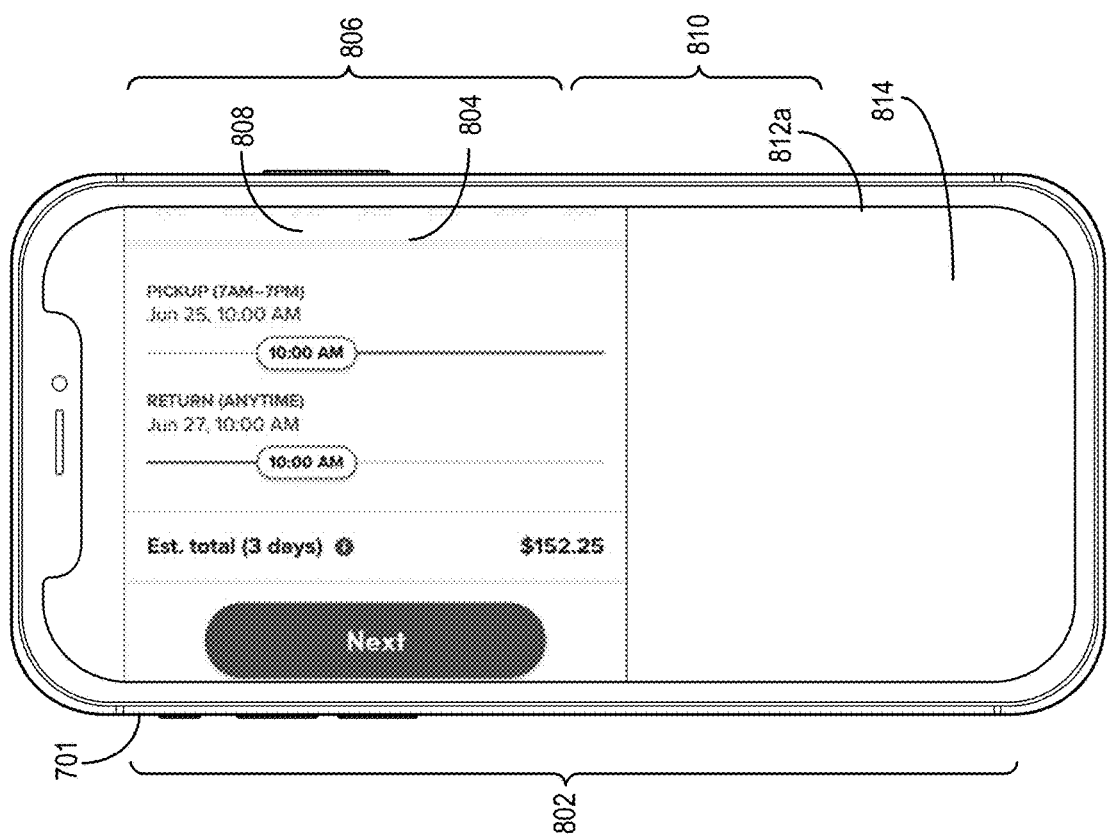

FIG. 8A illustrates a rental reservation-user interface 802 as an example graphical user interface by which the requestor 322 can generate or modify a rental vehicle reservation. Based on user interaction with elements of the rental reservation-user interface 802, the multi-modal transportation system 300 modifies the rental parameters utilized in determining the data for the rental route. As illustrated in FIG. 8A, the rental reservation-user interface 802 includes a calendar 806 including a selected-rental-duration element 804 and a duration discount notification 808. The rental reservation-user interface 802 further comprises a vehicle pickup and return time element 810, a rental vehicle rate 812a, and a requestor modification confirmation element 814.

As illustrated, the calendar 806 comprises a visual representation of a monthly calendar. The multi-modal transportation system 300 visually indicates (e.g., by generating a circle around) the selected-rental-duration element 804 based on requestor interaction with the rental reservation user interface 802. For example, the requestor device 323 can generate the selected-rental-duration element 804 based on detecting a user tap of the first and last dates or a dragging motion between the dates of the desired rental duration. As illustrated, the requestor device 323 generates the selected-rental-duration element 804 indicating that the requestor 322 selected the rental duration of June 29-July 1.

As further shown in FIG. 8A, the rental reservation-user interface 802 also includes the duration discount notification 808. The requestor device 323 presents the duration discount notification 808 based on determining that the rental duration meets a threshold length. The duration discount notification 808 indicates the discount value and the reason for the discount. The requestor device 323 may also present additional notifications in place of (or in addition to) the duration discount notification 808. For example, the requestor device 323 can present a notification indicating a reduced rate contingent on returning the rental vehicle at a particular rental vehicle location. As further illustrated in FIG. 8A, the calendar 806 includes both date values as well as predicted daily rates. For example, the multi-modal transportation system 300 associates each date with a predicted daily rate. As discussed previously, the multi-modal transportation system 300 can dynamically generate the predicted daily rates based on seasonality, demand, location, etc.

Relatedly, as further illustrated in FIG. 8A, the rental reservation-user interface 802 includes the vehicle pickup and return time element 810. Based on detected requestor interaction with the vehicle pickup and return time element 810, the multi-modal transportation system 300 adjusts the rental vehicle pickup time and the rental vehicle return time.

In addition to a calendar and return times, the requestor device 323 presents the rental vehicle rate 812a. More specifically, the multi-modal transportation system 300 generates the rental vehicle rate 812a based on the received requestor modifications. In at least one embodiment, the multi-modal transportation system 300 adjusts and transmits the rental vehicle rate 812a in real-time to reflect the most recent requestor modifications. For example, based on changes to the rental vehicle parameters, the multi-modal transportation system 300 may recalculate and update the rental vehicle rate 812a.

Based on detecting selection of the requestor modification confirmation element 814, the multi-modal transportation system 300 confirms the received requestor modifications. Consequently, the requestor device 323 presents a reservation-review-user interface to provide an overview of the rental route based on the requestor-modified rental parameters. For example, FIG. 8B illustrates a reservation-review-user interface 826a including various confirmation elements. As illustrated in FIG. 8B, the reservation-review-user interface 826a includes a rental vehicle location element 816, a rental-return-location element 818, a rental duration element 820, a rental vehicle detail element 824, a rental reservation element 828, and rental vehicle rate 812b. As shown in FIG. 8B, the requestor device 323 presents the rental vehicle-location element 816, the rental-return-location element 818, and the rental duration element 820. The requestor device 323 presents information regarding the rental vehicle location such as the address via the rental vehicle-location element 816. Likewise, the requestor device 323 presents return location information including the return location address via the rental-return-location element 818. The requestor device 323 also presents the rental duration dates via the rental duration element 820. Based on detected interaction with any one of the above-mentioned elements, the multi-modal transportation system 300 can adjust the corresponding rental parameter. For example, based on detecting requestor selection of the rental vehicle-location element 816, the multi-modal transportation system 300 may generate and transmit prompts for selecting a different rental vehicle location for picking up the vehicle.

As illustrated in FIG. 8B, the reservation-review-user interface 826a also includes the rental vehicle detail element 824. The requestor device 323 presents, via the rental vehicle detail element 824, information regarding the rental vehicle. For example, rental vehicle detail element 824 includes rental route information comprising the make and model, number of seats, gas mileage, daily rental rate, and other information. As illustrated, the rental vehicle detail element 824 may include an interactive modification element (e.g., a "Change car" button). Based on detecting interaction with the interactive modification element, the multi-modal transportation system 300 transmits, for display at the requestor device 323, alternative rental vehicles.

As illustrated in FIG. 8B, the reservation-review-user interface 826a includes a payment option element 830. The payment option element 830 indicates the payment option that will be used to cover the cost of the rental vehicle. Based on detecting user interaction with the payment option element 830, the requestor device 323 may present alternative payment options or allow the requestor 322 to input a new payment method. In at least one embodiment, the multi-modal transportation system 300 transmits for display a notification in addition to the payment option element 830 to notify the requestor 322 that a different payment option than the one currently selected offers additional rental vehicle coverage. For example, the requestor device 323 may include a notification icon (e.g., a red dot) within the payment option element 830 to notify the requestor 322.

As further shown in FIG. 8B, the reservation-review-user interface 826a also includes the rental reservation element 828. The multi-modal transportation system 300 confirms the rental vehicle details based on detected interaction with the rental reservation element 828. For example, based on detected selection of the rental reservation element 828, the multi-modal transportation system 300 reserves the identified rental vehicle for the selected rental duration. As part of reserving the rental vehicle, the multi-modal transportation system 300 pairs the rental vehicle with the requestor 322.

Figure 8D:
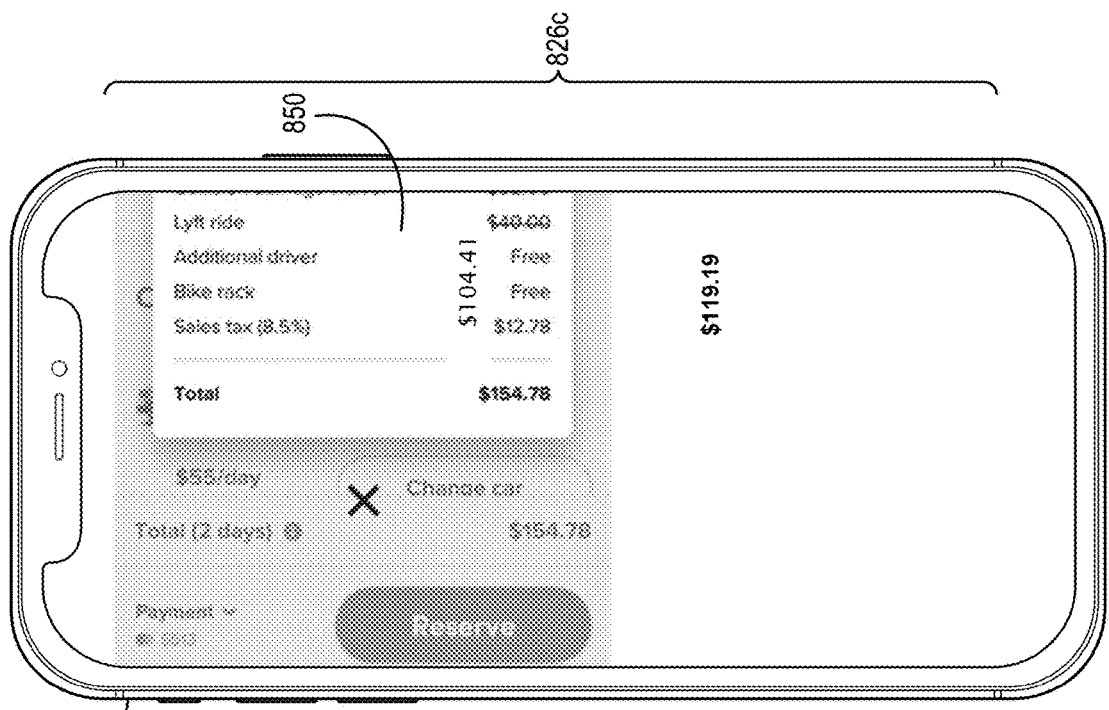
Figure 8C:
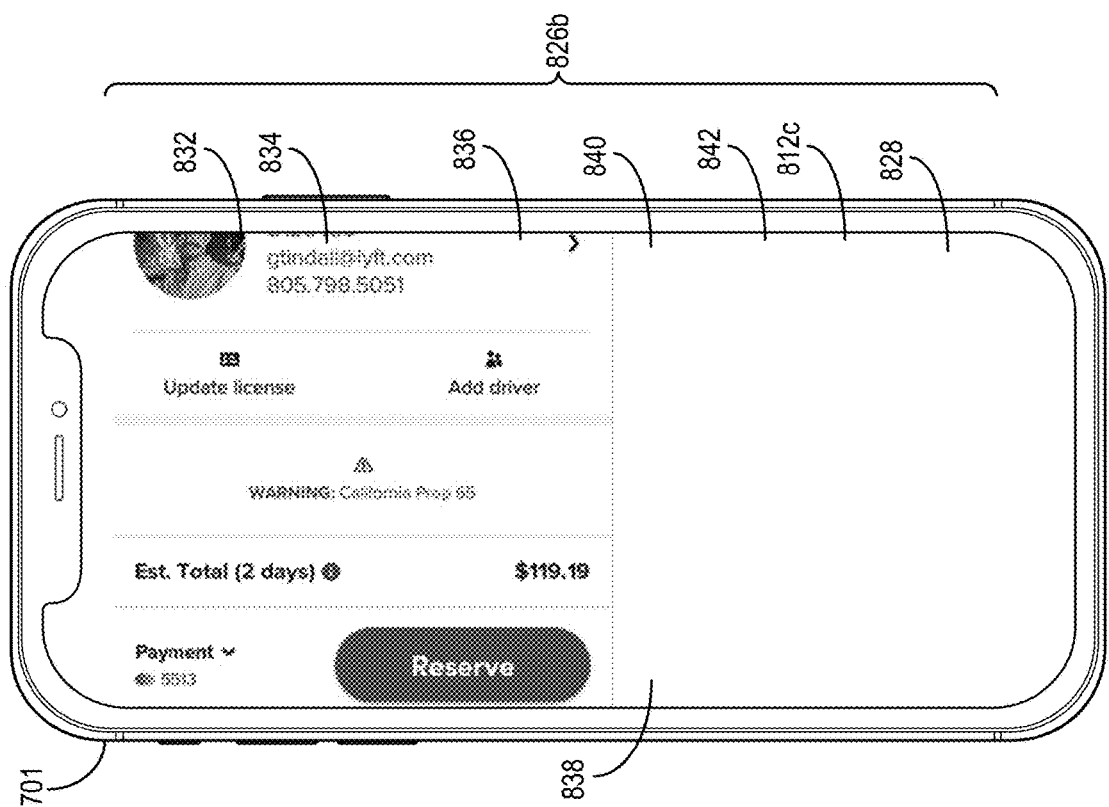

The reservation-review-user interface 826a may include additional confirmation elements to those illustrated in FIG. 8B. For example, the requestor device 323 may, based on detecting a scrolling motion, present additional confirmation elements. FIG. 8C illustrates additional confirmation elements in accordance with one or more embodiments. For example, the requestor device 323 presents the reservation-review-user interface 826b illustrated in FIG. 8C including a rental coverage element 832, an add-on selection element 834, driver information 836, an update license element 838, an add driver element 840, and an additional information element 842. Additionally, the reservation-review-user interface 826b includes rental vehicle rate 812c.

Based on user interaction with the rental coverage element 832 illustrated in the reservation-review-user interface 826b of FIG. 8C, the multi-modal transportation system 300 adds and/or adjusts rental coverage information. In at least one embodiment, the multi-modal transportation system 300 provides various degrees of coverage. Based on selection of the rental coverage element 832, the multi-modal transportation system 300 may also transmit, for display, additional coverage options including coverage provided by the payment companies associated with the payment option selected by the requestor 322.

In addition to coverage options, the reservation-review-user interface 826b includes interactive elements for selecting rental vehicle add-ons. As illustrated in FIG. 8C, the multi-modal transportation system 300 also provides the add-on selection element 834. Based on selection of the add-on selection element 834, the requestor device 323 presents various add-on options. As mentioned previously, the multi-modal transportation system 300 may provide additional options including child/baby seats, bike or other gear racks, snow gear, GPS navigation units, and other add-ons.

As further shown in FIG. 8C, the multi-modal transportation system 300 also presents the driver information 836 via the reservation-review-user interface 826b. In at least one embodiment, the multi-modal transportation system 300 automatically predicts the driver information 836 based on information from the requestor device 323 of the requestor 322. For example, the multi-modal transportation system 300 accesses information stored by the dynamic transportation matching system regarding the requestor 322. As illustrated, the driver information 836 includes the driver name, license number, and contact information. The requestor 322 may select the driver information 836 and provide updated driver information.

Additionally, in at least one embodiment, the multi-modal transportation system 300 may identify a new driver based on user interaction with the driver information 836. As illustrated in FIG. 8C, the driver information 836 corresponds to the requestor 322 associated with the requestor device 323. If the requestor 322 wishes to rent the vehicle for a new driver that is not associated with the requestor device 323, the multi-modal transportation system 300 may update the driver information 836. More specifically, the multi-modal transportation system 300 will receive identification information for the new driver so that the multi-modal transportation system 300 may communicate directly with the mobile device associated with the new driver.

As further illustrated in FIG. 8C, the multi-modal transportation system 300 may also update the driver's license on file for the requestor 322 based on a selection of the update license element 838. For example, based on selection of the update license element 838, the multi-modal transportation system 300 may update the reservation-review-user interface 826b to display the current driver's license on file corresponding to the driver information 836. The multi-modal transportation system 300 presents, to the requestor 322, an option to update or continue using the current driver's license. If the requestor 322 opts to update the driver's license, the multi-modal transportation system 300 transmits data corresponding to options to update the license. In one embodiment, the multi-modal transportation system 300 transmits data for the requestor device 323 to present interactive elements by which the requestor 322 can manually input updated driver's license information. In another embodiment, the multi-modal transportation system 300 accesses the camera of the requestor device 323 to take a picture of the updated driver's license. The multi-modal transportation system 300 may then extract driver's license information from the picture of the updated driver's license.

Based on interaction with the add driver element 840, the multi-modal transportation system 300 provides options to add authorized drivers. The multi-modal transportation system 300 may transmit data for interactive elements by which the requestor 322 may manually input information for additional drivers. Additionally, or alternatively, the multi-modal transportation system 300 may again access the camera of the requestor device 323 to take a picture of the additional driver's license.

The multi-modal transportation system 300 may also present additional information in the additional information element 842. As further illustrated in FIG. 8C, the multi-modal transportation system 300 transmits additional information relevant to operating a vehicle within a particular geographical area. For example, the reservation-review-user interface 826b includes a "Prop 65" legal warning for drivers within the state of California. Based on requestor selection of the additional information element 842, the multi-modal transportation system 300 updates the graphical user interface to provide additional detail regarding the indicated additional information.

As mentioned with reference to FIGS. 8A-8C, the multi-modal transportation system 300 sends data for the requestor device 323 to present the rental vehicle rates 812a-812c in a graphical user interface. In at least one embodiment, based on detecting a user selection of one of the rental vehicle rates 812a-812c, the requestor device 323 updates a corresponding reservation review-user interface to present an itemized rental vehicle rate notification. FIG. 8D illustrates the requestor device 323 presenting an itemized rental vehicle rate notification 850 within a reservation-review-user interface 826c. The itemized rental vehicle rate notification 850 includes an itemized list of costs that add up to the rental vehicle rate. As previously discussed, the itemized rental vehicle rate notification 850 may include the daily rate, insurance coverage rate, intermediate route rate, and any additional rates including additional driver rates, add-on rates, taxes, and others.

FIGS. 8A-8D present example graphical user interfaces that the multi-modal transportation system 300 uses to receive requestor modifications to the rental parameters and confirm the paired rental vehicle. As discussed, the multi-modal transportation system 300 determines the intermediate transportation route to transport the requestor 322 from the pickup location to the rental vehicle location. In some embodiments, the multi-modal transportation system 300 determines the intermediate transportation route when matching the requestor 322 and the rental vehicle. In other embodiments, the multi-modal transportation system 300 determines the intermediate transportation route at the beginning of the rental duration. FIGS. 9A-9E illustrate an example series of graphical user interfaces for selecting an intermediate route.

Figure 9B:
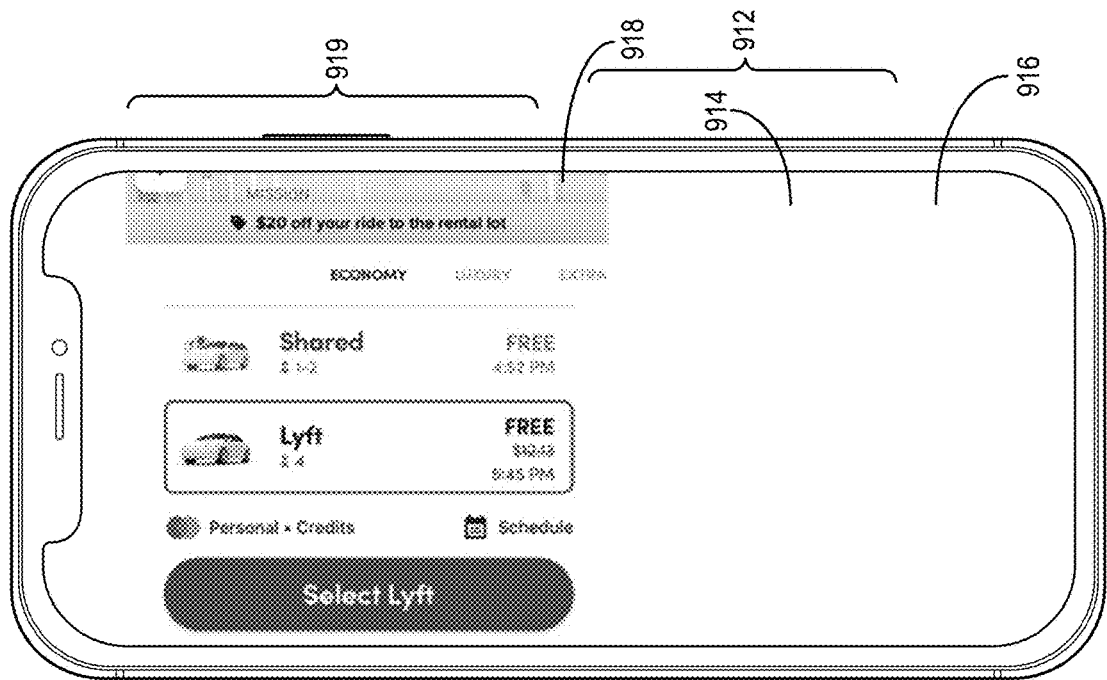
Figure 9A:
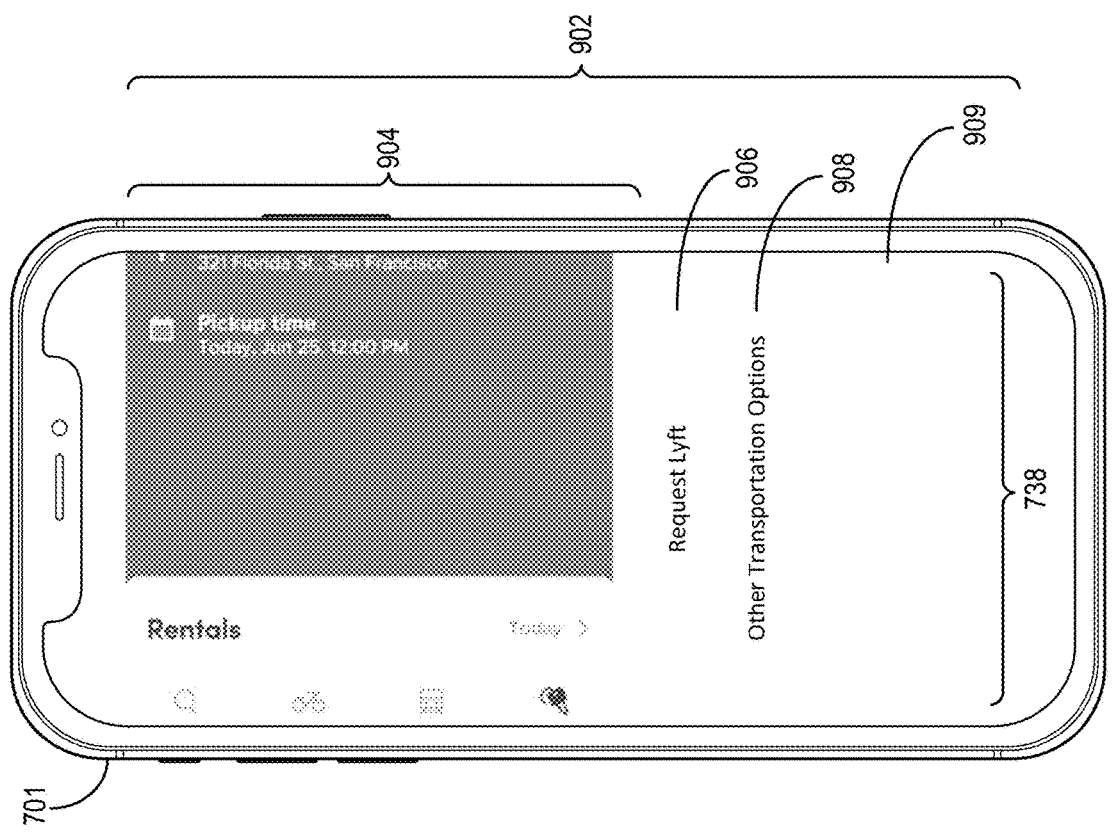

As illustrated in FIG. 9A, the multi-modal transportation system 300 sends data to the requestor device 323 to present an intermediate transportation graphical user interface 902. The requestor device 323 presents the intermediate transportation graphical user interface 902 to receive user input regarding the desired intermediate transportation route. The intermediate transportation graphical user interface 902 includes rental vehicle-pickup information 904, a provider-matching option 906, an alternative-transportation option 908, a rental vehicle information element 909, and the route-option elements 738.

The requestor device 323 presents, via the rental vehicle-pickup information 904, information regarding the rental vehicle, the rental vehicle location, and the rental vehicle reservation. For example, as illustrated in FIG. 9A, the rental vehicle-pickup information 904 includes a representation of the rental vehicle, the address of the rental vehicle location, and the pickup time for the rental vehicle.

As further shown in FIG. 9A, the intermediate transportation graphical user interface 902 also includes the provider-matching option 906. Based on detected selection of the provider matching option 906, the requestor device 323 updates the graphical user interface to present provider-matching transportation options. For example, based on detecting selection of the provider-matching option 906, the requestor device 323 presents a provider-matching-user interface as illustrated in FIG. 9B below.

Similarly, based on detected interaction with the alternative-transportation option 908 illustrated in FIG. 9A, the requestor device 323 updates the graphical user interface to present alternative intermediate transportation options including bikeshare/scooter-share and public transportation options. FIG. 9C and the accompanying discussion provide additional detail regarding an example alternative intermediate transportation graphical user interface by which the requestor device 323 presents additional intermediate transportation options.

As further shown in FIG. 9A, based on detecting selection of the rental vehicle information element 909, the requestor device 323 updates the graphical user interface to provide additional information regarding the rental vehicle. For example, the requestor device 323 may update the graphical user interface to include additional information similar to that illustrated in FIGS. 8A-8D regarding the rental vehicle duration, coverage information, add-on information, and other information.

Additionally, the requestor device 323 presents, as part of the intermediate transportation graphical user interface 902 illustrated in FIG. 9A, the route-option elements 738 as described above with respect to FIG. 7B. In at least one embodiment, the requestor device 323 presents the nearest available transportation options based on selection of the corresponding icon. For example, if the requestor 322 would like to see what bikeshare options are nearby, the requestor 322 may select the bike icon.

As mentioned, based on detecting selection of the provider-matching option 906, the requestor device 323 presents a provider-matching-user interface. FIG. 9B illustrates an example provider-matching-user interface 910. The provider-matching-user interface 910 includes a provider location map element 919, a discount notification 918, intermediate provider matching transportation options 912 including a selected intermediate provider transportation option 914, and an intermediate provider vehicle selection element 916.

As illustrated in FIG. 9B, the provider location map element 919 includes icons that indicate the locations of the requestor 322, the rental vehicle location, and available intermediate provider vehicles. Additionally, the provider location map element 919 includes the predicted route by which the intermediate provider vehicle transports the requestor 322 to the rental vehicle location. For example, the route shown in the provider location map element 919 represents the first segment of the rental route by which an intermediate vehicle transports the requestor 322 to the rental vehicle location.

The provider-matching-user interface 910 illustrated in FIG. 9B also includes the discount notification 918. In particular, the multi-modal transportation system 300 may provide a discount for the intermediate route if the multi-modal transportation system 300 determines to utilize an intermediate provider vehicle to transport the requestor 322 to the rental vehicle location. For example, as illustrated, the multi-modal transportation system 300 notifies the requestor 322 of a $20 discount off the intermediate provider vehicle ride.

The requestor device 323 also presents various intermediate provider vehicle options via the intermediate provider matching transportation options 912. For example, the multi-modal transportation system 300 transmits potential options including a private intermediate provider vehicle, a shared intermediate provider vehicle, luxury vehicles, and vehicles with extra space.

As further illustrated in FIG. 9B, the requestor device 323 detects an interaction with the selected intermediate provider transportation option 914. The requestor device 323 may automatically update the provider location map element 919 to present the location of the intermediate provider vehicle corresponding to the selected intermediate provider transportation option 914. Based on receiving a detected interaction with the intermediate provider vehicle selection element 916, the multi-modal transportation system 300 sends intermediate transportation request information to the selected intermediate provider vehicle via the intermediate provider vehicle device.

As mentioned, based on detecting user selection of the alternative-transportation option 908 illustrated in FIG. 9A, the requestor device 323 presents an alternative intermediate transportation graphical user interface. FIGS. 9C-9D illustrate alternative intermediate transportation graphical user interfaces 920a and 920b, respectively. In particular, the alternative intermediate transportation graphical user interfaces 920a-920b include various other intermediate transportation options beside the intermediate provider transportation option.

As illustrated in FIG. 9C, for example, the requestor device 323 presents the alternative intermediate transportation graphical user interface 920a based on receiving data from the multi-modal transportation system 300. The alternative intermediate transportation graphical user interface 920a includes an intermediate vehicle location map 944a, an intermediate transportation selection element 932, a select-route option 940, and a route-modification option 942.

As illustrated in FIG. 9C, the intermediate vehicle location map 944a indicates the locations of intermediate vehicles and a route to the rental vehicle location. For example, the intermediate vehicle location map 944a includes a requestor icon 926, a bike share icon 922, a transit icon 924, and a rental vehicle location icon 930. The icons represent the locations of the respective intermediate vehicles for the intermediate transportation route. The multi-modal transportation system 300 provides directions to the requestor 322 via the requestor device 323 within the intermediate vehicle location map 944a. For example, the multi-modal transportation system 300 directs the requestor 322 to walk via a walking route 928 to the location indicated by the bike share icon 922. The multi-modal transportation system 300 can determine that the requestor 322 has accessed an intermediate bikeshare bicycle based on determining that the requestor 322 is in proximity to the intermediate bikeshare bicycles. For example, the multi-modal transportation system 300 may access location information of the requestor device 323 and/or distance signals (e.g., Bluetooth signals) communicated between the requestor device 323 and the bike share system. Based on determining that the requestor 322 is in proximity to the intermediate bikeshare bicycles, the multi-modal transportation system 300 directs the requestor 322 via the requestor device 323 to the transit location indicated by the transit icon 924.

As further illustrated in FIG. 9C, the intermediate transportation selection element 932 presents various intermediate transportation options, including a selected-intermediate-route summary 934. The requestor device 323 may, using interaction with elements within the intermediate transportation selection element 932, present different intermediate transportation options. For example, the requestor device 323 can present the fastest intermediate transportation route, intermediate transportation routes that utilize only bikes/scooters, and/or intermediate transportation routes that only use public transit. As illustrated, the requestor device 323 presents the fastest intermediate transportation option that utilizes a combination of bike/scooter and transit options.

As further illustrated in FIG. 9C, the requestor device 323 detects a selection of an intermediate route indicated by the selected-intermediate-route summary 934. The selected intermediate-route summary 934 indicates details for the intermediate route, including the intermediate vehicles involved, the predicted intermediate vehicle rate, and the estimated time of arrival at the rental vehicle location. The requestor device 323 updates the intermediate vehicle location map 944a based on the selected-intermediate-route summary 934 and data from the multi-modal transportation system 300. As illustrated, the selected-intermediate-route summary 934 visually references a bike, transit, and walking to reach the rental vehicle location. Thus, the requestor device 323 presents the intermediate vehicle location map 944a indicating the selected intermediate transportation route.

As further shown in FIG. 9C, the requestor device 323 presents further options for selecting or modifying an intermediate route—including a select-route option 940 to select an intermediate route indicated by the selected-intermediate-route summary 934 and a route-modification option 942 to view options to adjust a selected intermediate route. Based on detecting a selection of the select-route option 940, the multi-modal transportation system 300 directs the requestor 322 via the requestor device 323 to the rental vehicle location using the selected intermediate vehicles. Based on detecting a selection of the route-modification option 942, the multi-modal transportation system 300 may adjust options for the intermediate route. The multi-modal transportation system 300 may receive, from the requestor device 323, intermediate route preferences. For example, the requestor device 323 can indicate to the multi-modal transportation system 300 that the requestor 322 would like to eliminate public transportation options. Additionally, the requestor device 323 can send a request to the multi-modal transportation system 300 to view additional intermediate transportation options including ferries, taxis, and others.

As mentioned, the multi-modal transportation system 300 may present specific instructions or directions to the requestor 322 for using the intermediate transportation route. The multi-modal transportation system 300 may provide additional detail regarding individual intermediate transportation routes based on detected interaction with the intermediate vehicle location map 944a. For example, the requestor device 323 can update the alternative intermediate transportation graphical user interface 920a to provide additional detail regarding the walking route 928 based on a selection of the walking route 928. In other embodiments, the requestor device 323 provides detailed directions based on detecting selection of the select-route option 940. FIG. 9D illustrates the requestor device 323 updating the alternative intermediate transportation graphical user interface 920b to provide specific detail regarding the intermediate vehicle route.

As illustrated in FIG. 9D, the requestor device 323 updates the alternative intermediate transportation graphical user interface 920b to provide specific detail regarding the selected walking route 928. For example, the multi-modal transportation system 300 transmits data for the requestor device 323 to update the intermediate vehicle location map 944b. Additionally, the requestor device 323 updates the alternative intermediate transportation graphical user interface 920b to include selected intermediate route information 946, navigation instructions 948, and a route overview element 950.

The intermediate vehicle location map 944b illustrated in FIG. 9D includes more detailed information regarding the walking route 928. For example, the requestor device 323 presents a zoomed-in view of the walking route 928 to provide additional specifics regarding the walking route 928. In some embodiments, the intermediate vehicle location map 944b can include details such as street, landmark, and local building names.

As further illustrated in FIG. 9D, the alternative intermediate transportation graphical user interface 920b includes the selected intermediate route information 946. The selected intermediate route information 946 provides additional detail regarding the selected intermediate route portion. As illustrated, the requestor device 323 presents the distance that the requestor 322 needs to walk along the walk route 928. Additionally, the alternative intermediate transportation graphical user interface 920b may include the estimated time of arrival to either the next intermediate vehicle or the rental vehicle location within the selected intermediate route information 946.

The navigation instructions 948 include instructions to direct the requestor 322 along the intermediate transportation route. Though not illustrated, the navigation instructions 948 can be accompanied by audio instructions. The audio instructions may comprise dictated instructions as included in the navigation instructions 948.

Based on detecting interaction with the route overview element 950, the requestor device 323 returns to the alternative intermediate transportation graphical user interface 920a of FIG. 9C that provides an overview of the entire intermediate transportation route.

Figure 9E:
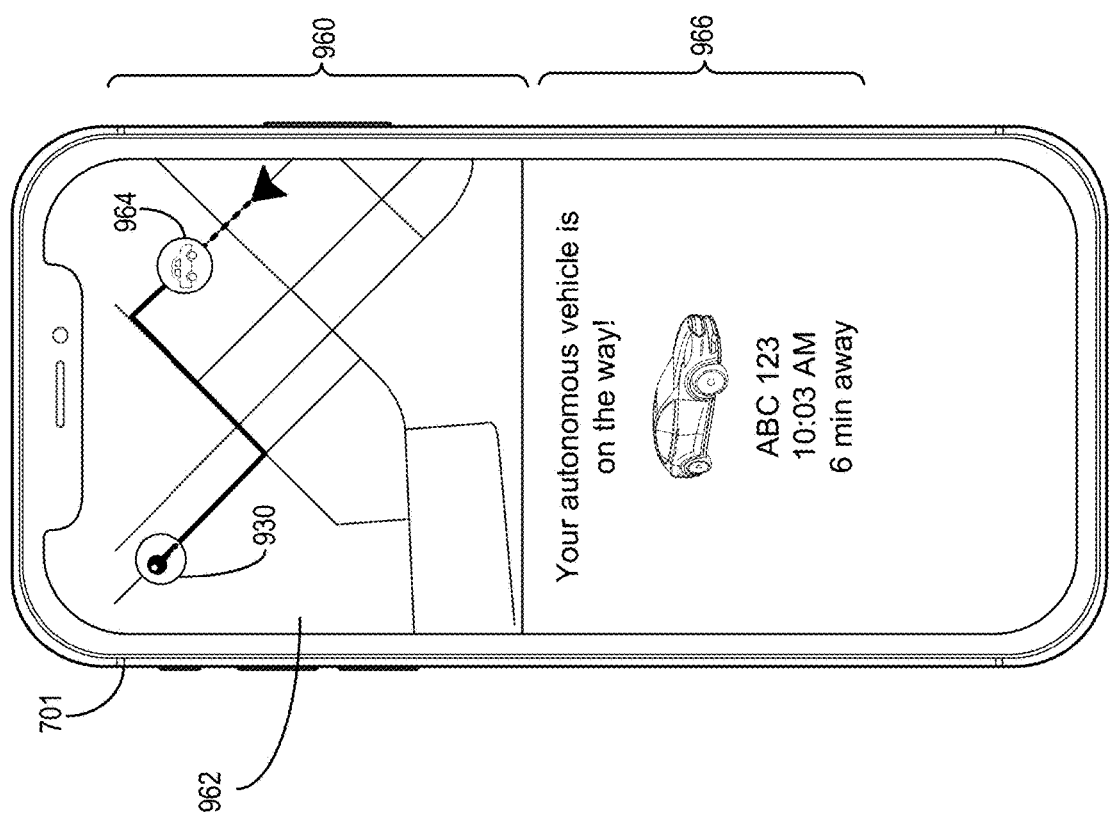

FIGS. 9A-9D illustrate example graphical user interfaces relating to intermediate transportation routes including provider-matching transportation options and alternative intermediate transportation options. As discussed previously, in at least one embodiment, the multi-modal transportation system 300 utilizes an autonomous vehicle along the intermediate transportation route. Though not illustrated in FIG. 9A, in at least one embodiment, the intermediate transportation graphical user interface 902 includes an autonomous vehicle selection element in addition to (or in place of) the provider-matching option 906 and the alternative-transportation option 908 illustrated in FIG. 9A. Based on detecting user selection of the autonomous vehicle selection element, the requestor device 323 presents an intermediate autonomous vehicle graphical user interface. FIG. 9E illustrates a vehicle-notification-user interface 962 for an autonomous vehicle. As illustrated in FIG. 9E, the vehicle-notification-user interface 962 includes an autonomous vehicle location map 960 and autonomous vehicle information. The autonomous vehicle location map 960 includes the rental vehicle location icon 930 and an autonomous vehicle icon 964 indicating the current location of the autonomous vehicle. The autonomous vehicle information 966 includes information relevant to the autonomous vehicle. For example, the requestor device 323 presents information about the autonomous vehicle including an image of the autonomous vehicle and license plate information for the autonomous vehicle. The requestor device 323 may also present information including the estimated time of arrival for the autonomous vehicle to arrive at the current location of the requestor 322. Additionally, the requestor device 323 may present the make and model of the autonomous vehicle.

As detailed above, digital transportation passes may also provide access to optimized vehicle service centers (such as vehicle service center 612 in FIG. 6), where the user can schedule to have their vehicle serviced at an efficient and highly optimized service center (e.g., while they are at work). In some cases, users may request a driver to pick up their car, take it to the service center where the maintenance is performed, and return the car back to its original location, all as a digital transportation pass feature. Alternatively, a user may schedule mobile maintenance to come to them and work on their car while it is parked during the day.

Figure 10:
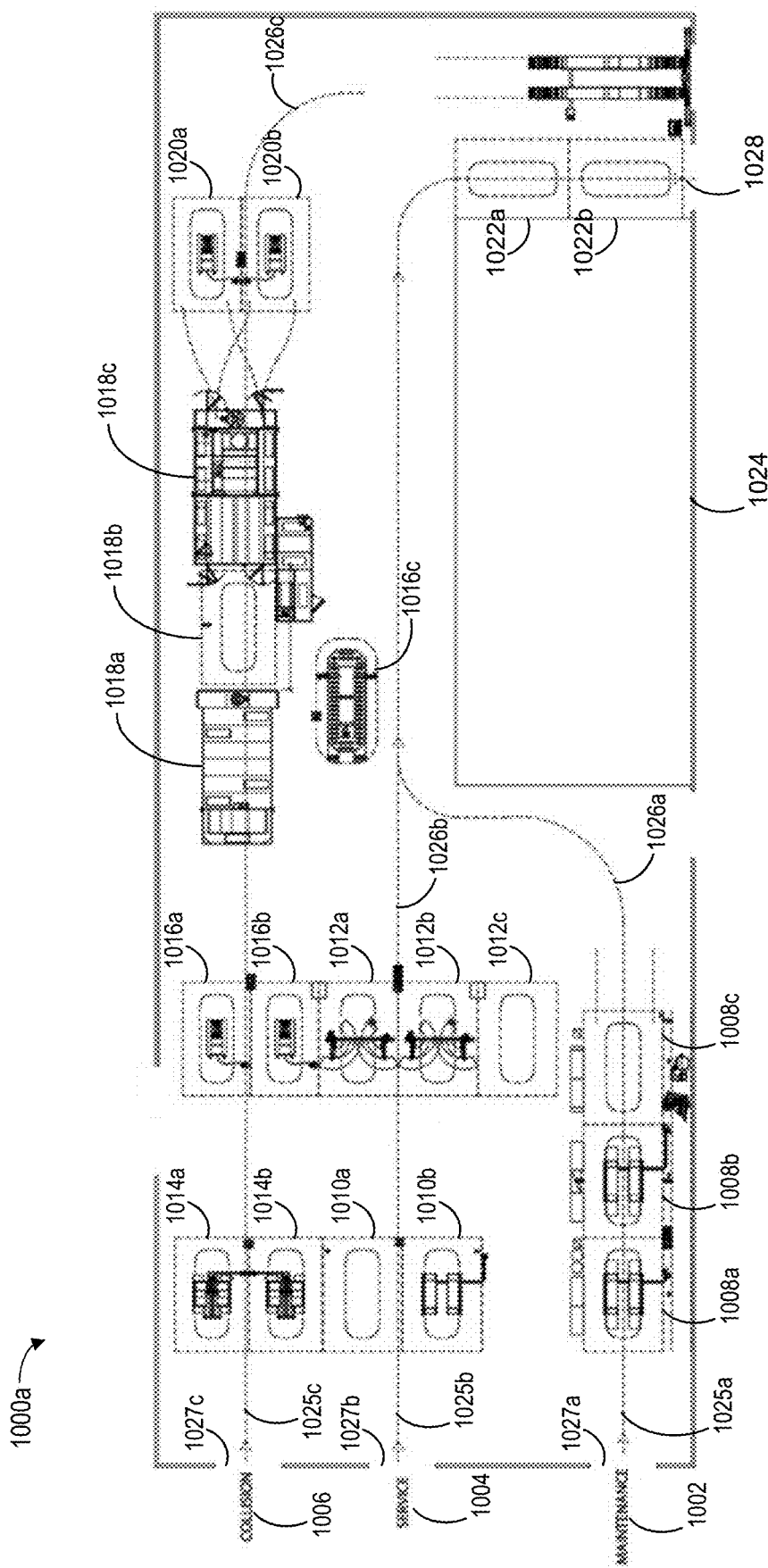
FIG. 10 illustrates a vehicle service center including a maintenance track, a service track, and a collision track in accordance with one or more embodiments.

FIG. 10 illustrates a diagram of a vehicle service center 1000a associated with the multi-modal transportation system 300 in accordance with one or more embodiments. In particular, the vehicle service center 1000a can perform a variety of services on provider vehicles. Accordingly, the multi-modal transportation system 300 can match provider vehicles to service times at the vehicle service center 1000a to perform one or more of the services on each of the provider vehicles that the vehicle service center 1000a provides.

As shown in FIG. 10, the vehicle service center 1000a includes a number of tracks for performing various types of services on provider vehicles. Specifically, the vehicle service center includes a maintenance track 1002, a service track 1004, and a collision track 1006. Each of the tracks includes a number of stations for servicing provider vehicles according to the service types corresponding to each track. Thus, when servicing a provider vehicle, the multi-modal transportation system 300 can determine whether a service to be performed corresponds to the maintenance track 1002, the service track 1004, or the collision track 1006. The multi-modal transportation system 300 can then assign or dispatch the provider vehicle to the corresponding track based on the identified service type.

In one or more embodiments, the maintenance track 1002 can correspond to a first set of services for performing routing maintenance on provider vehicles. For instance, the first set of services can include, but is not limited to, oil changes, tire rotations, filter replacements, or other simple repairs/replacements. Additionally, in one or more embodiments, the service track 1004 can correspond to a second set of services that include services not performed in the maintenance track 1002. For example, the second set of items can include, but is not limited to, repairs on broken, worn, or damaged vehicle components such as brakes, engine components, vehicle interior components, or similar repairs. In one or more embodiments, the collision track 1006 can correspond to a third set of services associated with vehicle body and collision services. To illustrate, the third set of services can include, but is not limited to, damage to vehicle bodies or structures, dent repair, paint, and touch up services.

Although the above description provides examples of services for each of the maintenance track 1002, service track 1004, and collision track 1006, the specific services provided within each track may be different than those described. For instance, the maintenance track 1002 may correspond to services that typically take less than a threshold amount of time, while the service track 1004 may correspond to services that typically take at least the threshold amount of time. In yet other examples, the services corresponding to each track may be based on other criteria, such as the tools required to perform each service, the areas of the vehicle corresponding to each service, or the abilities of the technicians in each lane.

As briefly mentioned, each track can include one or more stations for performing various services or partial services. To illustrate, the maintenance track 1002 of FIG. 10 includes a plurality of maintenance stations 1008a-1008c. In one or more embodiments, each of the maintenance stations 1008a-1008c corresponds to a different service or partial service. For example, a first maintenance station 1008a can correspond to a first maintenance service (e.g., changing oil/air filters), a second maintenance station 1008b can correspond to a second maintenance service (e.g., filling or rotating tires), and the third maintenance station 1008c can correspond to a third maintenance service (e.g., checking and filling other vehicle fluids). Additionally, the stations can perform different operations based on the tools required to perform the corresponding maintenance services, based on the provider vehicles, and/or based on technicians assigned to the stations. In another example, the first maintenance station 1008a can correspond to a preparatory operation that prepares provider vehicles for maintenance services performed at the second maintenance station 1008b or the third maintenance station 1008c.

In one or more embodiments, at least one of the maintenance stations 1008a-1008c includes one or more image capture devices for capturing images of provider vehicles entering the maintenance track 1002. The multi-modal transportation system 300 can utilize the image capture devices to capture images of the provider vehicles at different angles for storing with profiles of the provider vehicles. The multi-modal transportation system 300 can also capture images or readings of odometers or other measurement devices on provider vehicles for storing with profiles of the provider vehicles. The multi-modal transportation system 300 can also use the captured images to identify additional issues associated with provider vehicles, as described in more detail herein. For example, the multi-modal transportation system 300 can utilize a technician device or a machine-learning model to indicate possible issues for a provider vehicle within, or based on, the captured images.

FIG. 10 further illustrates that the service track 1004 includes a plurality of diagnostic stations 1010a-1010b and a plurality of service stations 1012a-1012c. In one or more embodiments, the diagnostic stations 1010a-1010b correspond to diagnostic services for diagnosing issues with provider vehicles. For example, the multi-modal transportation system 300 can identify an issue associated with a provider vehicle and then use the diagnostic stations 1010a-1010b to provide a more in-depth analysis of the identified issue (e.g., what is wrong and what needs to be fixed). The multi-modal transportation system 300 can also use vehicle data obtained for the provider vehicle in the maintenance track 1002 to inform the analysis at the diagnostic stations 1010a-1010b.

FIG. 10 illustrates that the service track 1004 also includes a plurality of service stations 1012a-1012b for servicing provider vehicles based on diagnoses from the diagnostic stations 1010a-1010b. To illustrate, after diagnosing an issue associated with a provider vehicle, the multi-modal transportation system 300 can direct the provider vehicle from a diagnostic station to one of the service stations 1012a-1012b. The multi-modal transportation system 300 can then provide the service(s) for fixing the diagnosed issues at the corresponding service station. Furthermore, as shown in FIG. 10, the maintenance track 1002 and the service track 1004 can share one or more washing stations (e.g., washing stations 1022a-1022b) for washing providers after providing services in the maintenance track 1002 or the service track 1004.

Additionally, FIG. 10 illustrates that the collision track 1006 includes a plurality of planning stations 10111A-1014b, body repair stations 1016a-1016c, paint stations 1018a-1018c, reassembly stations 1020a-1020b. In one or more embodiments, the planning stations 10111A-1014b are for planning and preparing provider vehicles for body/collision repair services performed in the body repair stations 1016a-1016c. Additionally, the body repair stations 1016a-1016c can include one or more light body repair stations (e.g., body repair stations 1016a-1016b) and one or more heavy body repair stations (e.g., body repair station 1016c). The collision track 1006 can include the paint stations 1018a-1018c for preparing, masking, and painting provider vehicles that have had body repairs. Finally, the collision track 1006 can also include one or more reassembly stations 1020a-1020b for re-assembling any provider vehicles that have been disassembled in any of the previous stations.

In one or more embodiments, the vehicle service center 1000a includes a number of stations in each track based on estimated times associated with performing services within each station. For example, if diagnostic services in the service track typically take fifteen minutes to perform, and services based on the diagnoses typically take about thirty minutes to perform, the vehicle services center can include enough service stations to accept vehicles from the diagnostic stations. Additionally, the vehicle service center 1000a can include a physical arrangement of stations within each track, and in separate tracks, that allows for technicians to easily move from one station to another, or from one track to another, to perform different services in the different stations and tracks. The multi-modal transportation system 300 can thus easily manage the schedule of technicians at each station and in each track to reduce or prevent excessive downtime in each station.

Furthermore, FIG. 10 illustrates that each track is a linear track that includes a single entry point (e.g., entry points 1025a-1025c corresponding to the separate tracks) and a single exit point (e.g., exit points 1026a-1026c corresponding to the separate tracks) following a linear progression through the tracks. In particular, as shown, each of the maintenance track 1002, the service track 1004, and the collision track 1006 includes an entry point that follows a linear progression of stations that lead to an exit point of the corresponding track. To illustrate, the maintenance track 1002 includes a linear progression through each of the maintenance stations 1008a-1008c. When a provider vehicle enters the maintenance track 1002 at the first maintenance stations 1008a, the provider vehicle passes through each of the following stations until exiting from the third maintenance station 1008c.

Although the tracks include individual exit points 1026a-1026c, as shown in FIG. 10, the service center itself (e.g., the building housing the service center) has a single building exit 1028. In some embodiments, the service center has multiple structure exits. For example, in some embodiments, the service center can include one structural exit for each track or some other number of structural exits (e.g., 2 or 4).

Furthermore, while FIG. 10 illustrates separate building entrances (a first entrance 1027a, a second entrance 1027b, and a third entrance 1027c) corresponding to each entry point for each track, respectively, a building that includes the tracks can have a single building entrance that leads to the entry points of the separate tracks. For example, in one embodiment, the vehicle service center 1000a may include a single building entrance prior to entry points of each track and a single building exit after the tracks. Additionally or alternatively, in other embodiments, the vehicle service center 1000a may have a single building entrance and a single building exit corresponding to the various tracks. As shown, the interior layout of each vehicle service center, and the corresponding maintenance track, service track, and collision track, can also vary based on the available space and shape of the building. In at least some implementations, some or all of the tracks may also be outside a building, such that the entry points and exit points for each track are open to a parking lot or other exterior structure.

Additionally, while each track may include more than one station at each step along the track (e.g., more than one diagnostic station or more than one service station), each provider vehicle entering the track passes through a single station at each step before progressing to the next step. For example, the service track 1004 includes a linear progression starting at an entry point, progressing through a series of stations (e.g., a diagnostic station 1010a followed by a service station 1012b), and out an exit point. Similarly, the collision track 1006 includes a linear progression starting at an entry point, progressing through a series of stations (e.g., a planning station 1014b, then a body repair station 1016a, then the paint stations 1018a-1018c, and lastly a reassembly station 1020b), and out an exit point. Thus, for an individual provider vehicle, each track is a linear track that starts at a single entry point and ends at a single exit point.

Additionally, while FIG. 10 illustrates that each track includes a specific number of stations for corresponding services, the tracks may each include a different number of stations than those illustrated. For example, a vehicle service center may include a plurality of maintenance tracks, each of which includes a single entry point leading to a plurality of maintenance stations and out a single exit point. Similarly, a vehicle service center may include any number of service tracks and/or collision tracks following a similar progression as illustrated in FIG. 10 for each track. Additionally, each track may include more or fewer stations that each provide different services than those described in relation to FIG. 10.

In addition to a plurality of tracks for providing services, the vehicle service center 1000a can include a location for providers to stay while their vehicles are in one or more of the tracks. For example, FIG. 10 illustrates that the vehicle service center 1000a includes an office area 1024 where providers can wait until their respective provider vehicles have exited one or more tracks. In one or more embodiments, the multi-modal transportation system 300 can notify a provider device of a location of the office area 1024 (e.g., by providing a map of the vehicle service center) once the multi-modal transportation system 300 has registered the provider vehicle and placed the provider vehicle in the maintenance track. The multi-modal transportation system 300 can also notify the provider device of updates, service status, etc., as previously mentioned, while the provider is in the office area 1024 (or another location if the provider does not stay at the vehicle service center 1000a). As mentioned previously, the multi-modal transportation system 300 can provide a request to the provider device of a provider vehicle if the multi-modal transportation system 300 determines to dispatch the provider vehicle to another track. Additionally, the multi-modal transportation system 300 can also provide a notification to the provider device indicating completion of one or more services on the provider vehicle. The multi-modal transportation system 300 can also notify the provider device of updates, service status, etc., as previously mentioned, while the provider is in the office area 1024 (or another location if the provider does not stay at the vehicle service center 1000a). As mentioned previously, the multi-modal transportation system 300 can provide a request to the provider device of a provider vehicle if the multi-modal transportation system 300 determines to dispatch the provider vehicle to another track. Additionally, the multi-modal transportation system 300 can also provide a notification to the provider device indicating completion of one or more services on the provider vehicle.

Figure 11A:
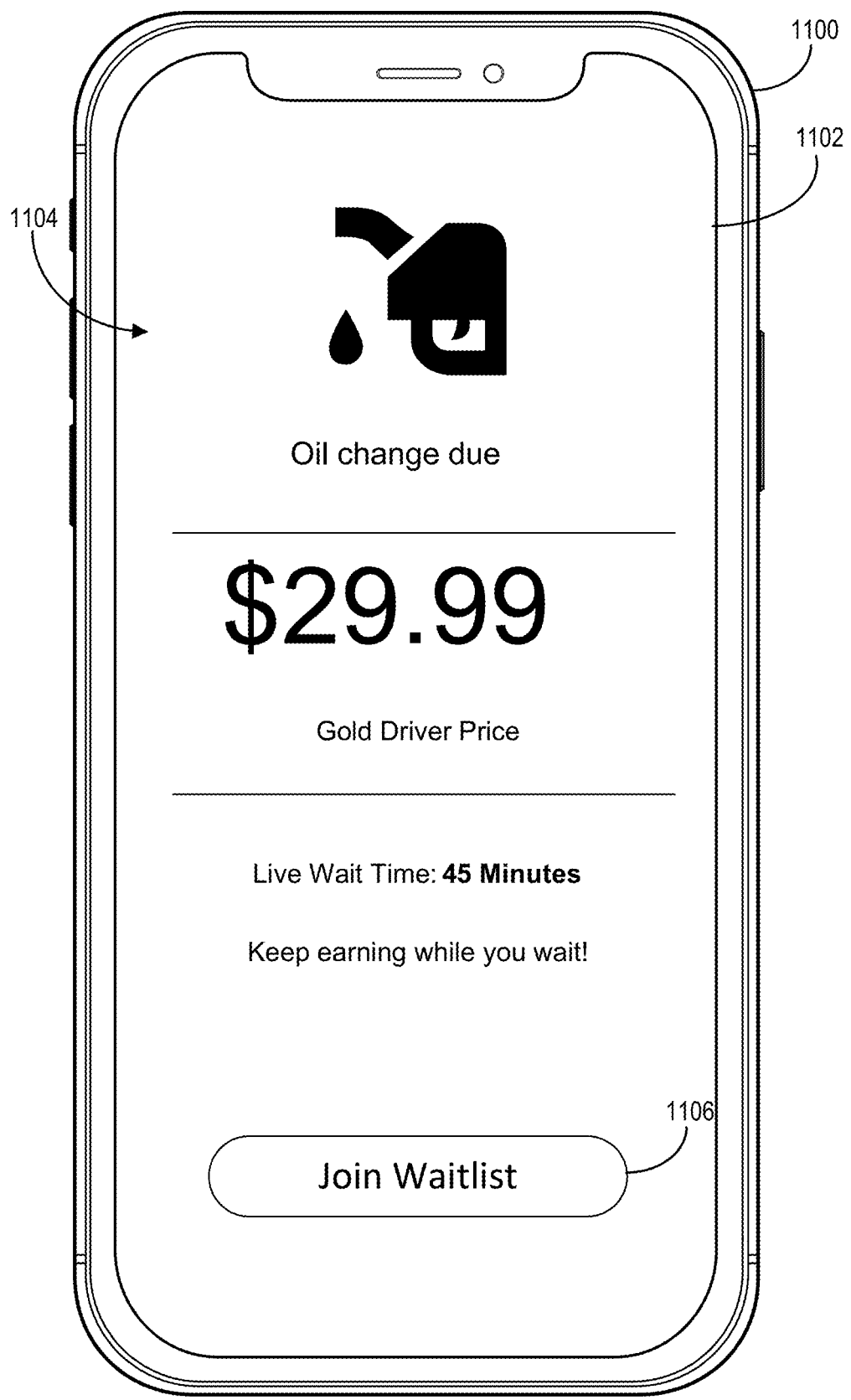
FIGS. 11A-11E illustrate graphical user interfaces of a provider device and a technician device for scheduling and performing a service for a provider vehicle in accordance with one or more embodiments.
Figure 11B:
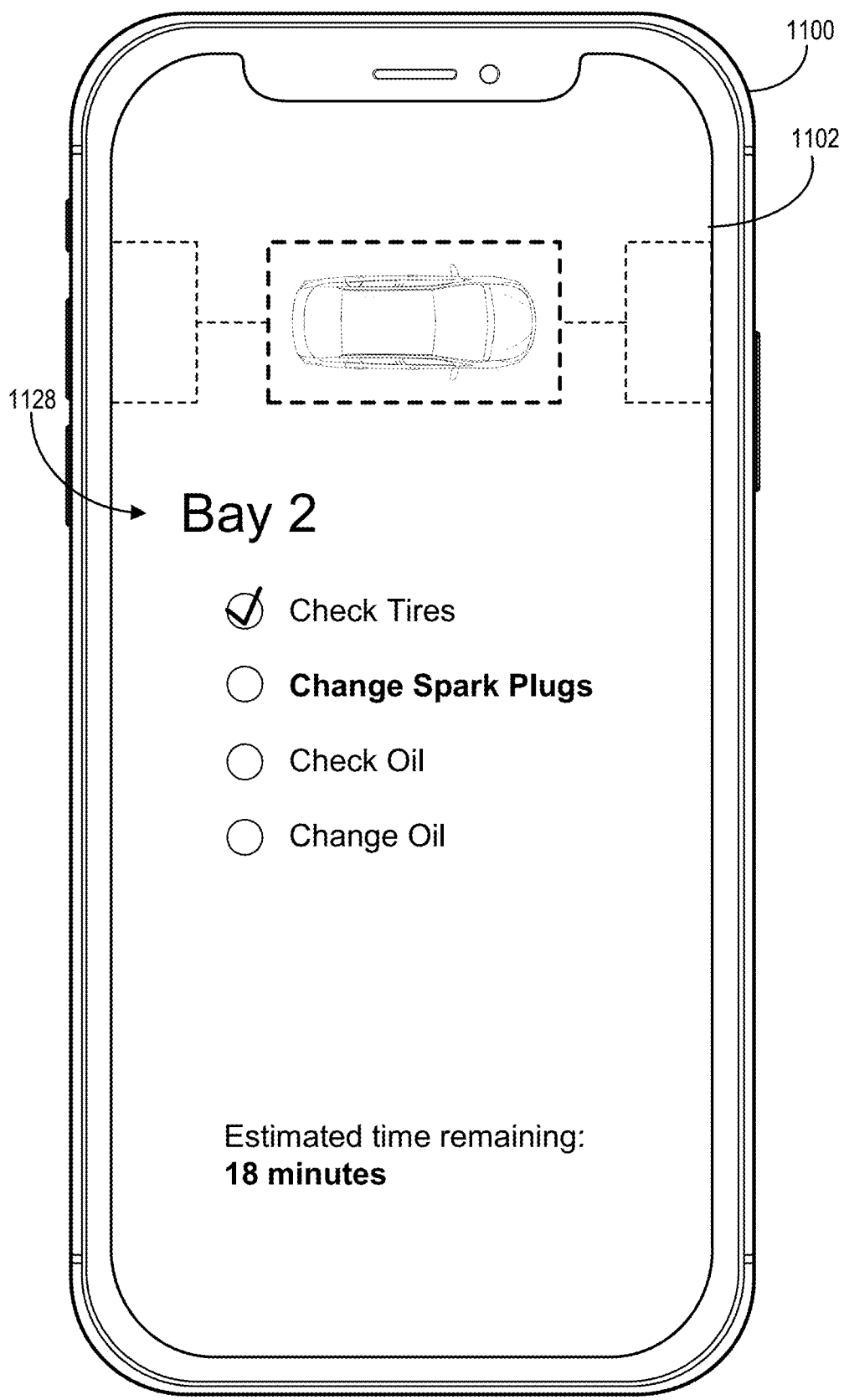

In one or more embodiments, the multi-modal transportation system 300 can communicate with a provider device 1100 to provide information to the provider device 1100 for a provider vehicle. For example, FIG. 11A illustrates that the multi-modal transportation system 300 can provide, for display within a graphical user interface in a provider application 1102 on a display device of the provider device 1100, service information indicating a service that is due for the provider vehicle. As previously mentioned, the multi-modal transportation system 300 can determine such service information from a profile associated with the provider device 1100. To illustrate, the provider device 1100 can be associated with a transportation matching system that matches transportation requests from requester devices to the provider device 1100. Accordingly, in one or more embodiments, the multi-modal transportation system 300 can utilize the transportation matching system to obtain profile information for the provider device 1100 and/or the provider vehicle.

In one or more embodiments, the multi-modal transportation system 300 can provide service information 1104 indicating a service type that is due for the provider vehicle, as shown in FIG. 11A. Specifically, FIG. 11A illustrates that the provider vehicle is due to have an oil change. The multi-modal transportation system 300 can determine that the service is due based on a previous service performed for the provider vehicle, a number of miles traveled by the provider vehicle, an amount of time since the last service, information monitored at the provider vehicle, user entry of vehicle conditions or problems via a user interface, or other data associated with the provider vehicle. The multi-modal transportation system 300 can then recommend a corresponding service to the provider device 1100.

The multi-modal transportation system 300 can also provide information associated with the cost of the recommended service. For example, the multi-modal transportation system 300 can provide a price for the service based on information in the profile associated with the provider device 1100. In one or more embodiments, the multi-modal transportation system 300 provides a discount to providers that have a higher standing with the transportation matching system. To illustrate, if the provider associated with the provider device 1100 has fulfilled a threshold number of transportation requests or has a threshold rating with the transportation matching system, the multi-modal transportation system 300 can include a discount price in the service information.

Additionally, FIG. 11A shows that the multi-modal transportation system 300 can also include an estimated current wait time for an available service time for the suggested service. Specifically, the multi-modal transportation system 300 can use information from a vehicle service center near the location of the provider device 1100 to determine the next available service time for the suggested service. To illustrate, the estimated wait time may be based on the number of provider vehicles currently being serviced, the number of vehicles scheduled to be serviced, the types of scheduled maintenance services, and the average amount of time that the vehicle service center takes to perform the suggested service.

As previously described, the multi-modal transportation system 300 improves estimated wait times for servicing vehicles. In particular, the multi-modal transportation system 300 can utilize station status information from a number of stations across a number of different tracks to accurately determine progression of vehicles through the tracks and availability of the tracks using various sensors and/or information from technician devices in conjunction with forecasting models. To illustrate, by tracking detailed progress information about all vehicles across all tracks, the multi-modal transportation system 300 can accurately determine expected wait times and provide real time information to technician devices and provider devices, which can eliminate unnecessary downtime associated with a particular maintenance service or sequence of maintenance services.

Furthermore, by performing different types of services within different tracks of the vehicle service center(s), the multi-modal transportation system 300 can avoid delays and changes in estimated wait times associated with unexpected maintenance issues. For instance, in response to determining that a provider vehicle requires a specific maintenance service while in a particular track, the multi-modal transportation system 300 can dispatch the provider vehicle to the corresponding track after completing a current maintenance service. This allows the multi-modal transportation system 300 to avoid holding up the current track to fix the unexpected maintenance issue.

Additionally, the physical arrangement of stations within each track, and across separate tracks can help the multi-modal transportation system 300 streamline the various services within and across the different tracks. To illustrate, the multi-modal transportation system 300 can position stations from different tracks associated with a particular technician (or type of technician) near each other while still separating the service flows into different tracks. This can allow the multi-modal transportation system 300 to generate a streamlined schedule for different maintenance services across different tracks that allows a particular technician to quickly move from one station to another across the different tracks.

In one or more embodiments, the provider device 1100 can also display a waitlist element 1106. In response to detecting a selection of the waitlist element 1106 at the provider device 1100, the multi-modal transportation system 300 can add the provider (or the provider device 1100, or the provider vehicle) to a waitlist for the suggested service. To illustrate, the multi-modal transportation system 300 can add a provider to the end of a queue for an oil change at the vehicle service center in response to a selection of the waitlist element 1106 at the provider device 1100. In one or more embodiments, during or after a maintenance service for a provider vehicle, the multi-modal transportation system 300 can provide updates to a provider device 1100 in connection with a current servicing of the provider vehicle. FIG. 11G illustrates the multi-modal transportation system 300 transmitting a service status 1128 for the provider vehicle to the provider device 1100 for display within the provider application 1102. The service status 1128 includes information indicating services that are already completed, a current service (e.g., "Change Spark Plugs" and a corresponding station), and services that are not yet complete to provide an overall workflow of the services being performed on the provider vehicle. The service status 1128 can also include an estimated time remaining on the services that the vehicle service center is completing for the provider vehicle. As the vehicle service center completes the services, the multi-modal transportation system 300 can update the service status 1128 to reflect the most recent available information in real-time.

Figure 11C:
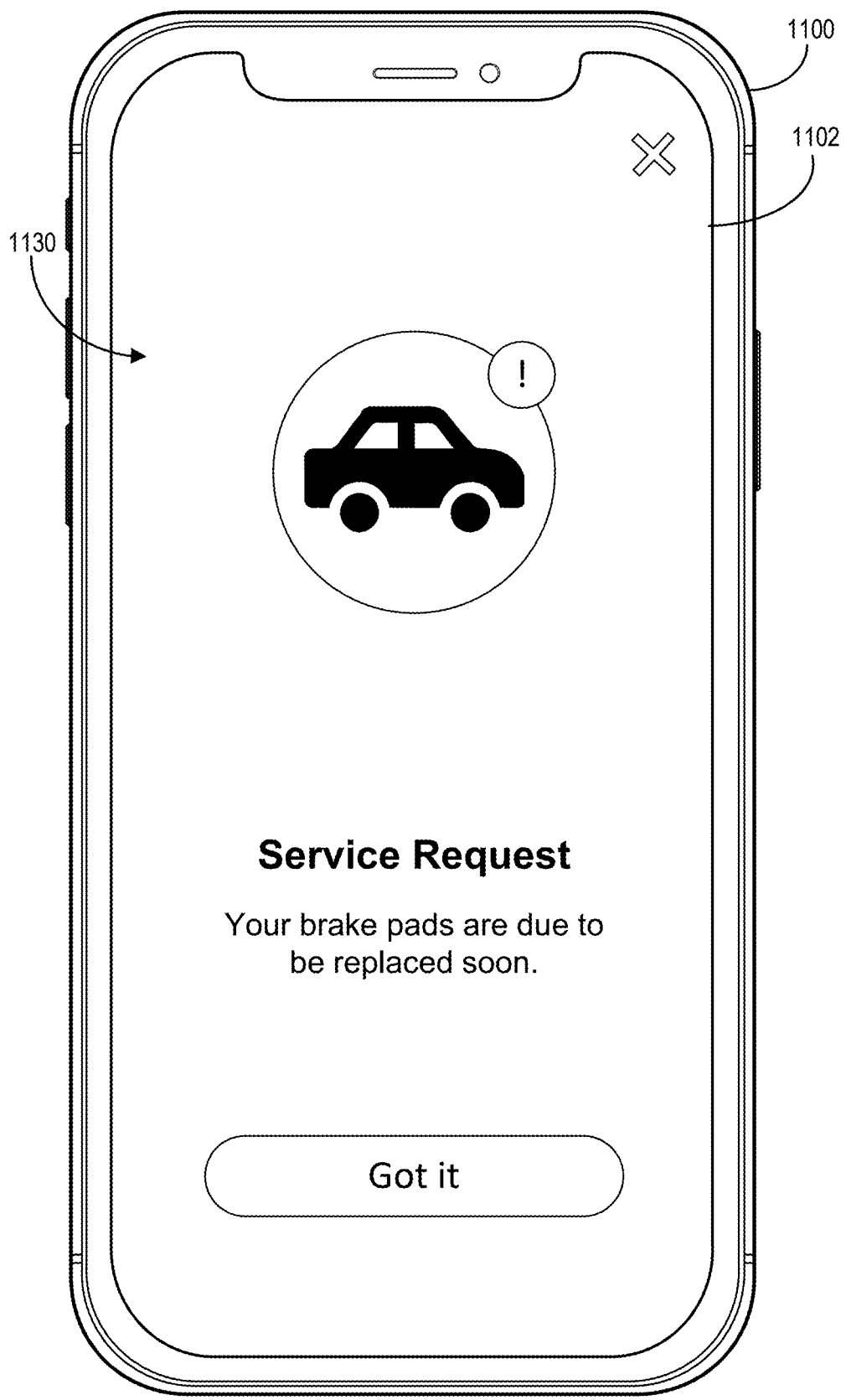

In addition, the multi-modal transportation system 300 can also determine that the provider vehicle requires (or could benefit from) additional services not performed in the maintenance track. FIG. 11C illustrates that the multi-modal transportation system 300 can send a service request notification 1130 to the provider device 1100 for display within the provider application 1102. The service request notification 1130 can include information indicating the additional service(s) that the provider vehicle may need (e.g., "Your brake pads are due to be replaced soon."). In one or more embodiments, the service request notification 1130 may also include a request for the vehicle service center to perform the additional service(s) during the current visit. If the provider device indicates that the provider has selected an option to accept the request (i.e., the provider gives permission to perform the service), the multi-modal transportation system 300 can dispatch the provider vehicle to one or more other tracks at the vehicle service center based on the additional service(s).

Figure 11D:
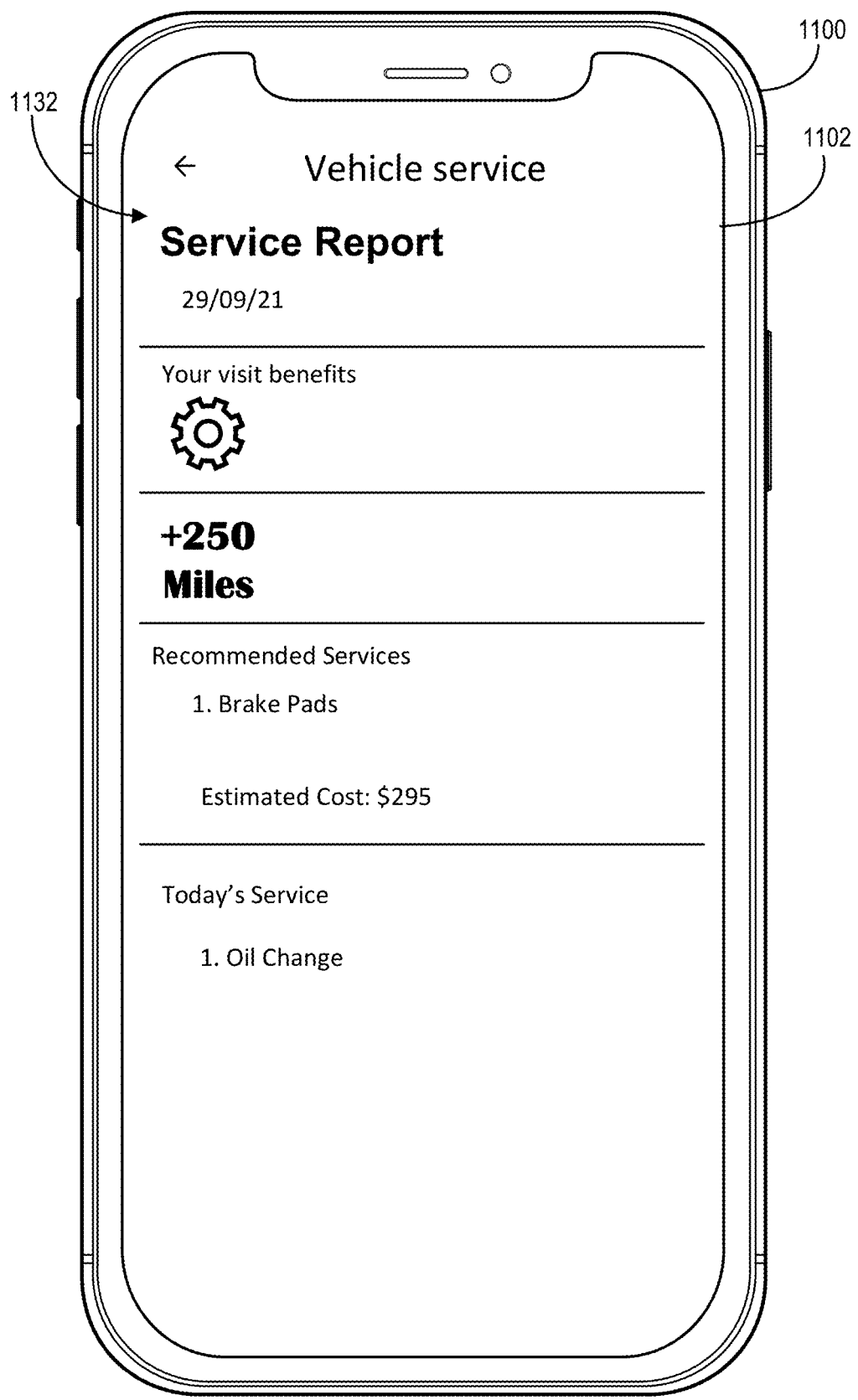

Alternatively, rather than requesting permission to perform the additional service(s) at the current time, the multi-modal transportation system 300 may add the additional service(s) to a service report for the provider vehicle. In one or more embodiments, as illustrated in FIG. 11D, the multi-modal transportation system 300 can generate and provide a service report 1132 including service information for the current visit to the vehicle service center. The service report 1132 can also include one or more additional recommended services (e.g., based on the identified issues), as well as estimated costs for the additional service(s). Additionally, the service report 1132 can include information about savings that the multi-modal transportation system 300 can provide to the provider based on the regular maintenance of the provider vehicle.

Figure 11E:
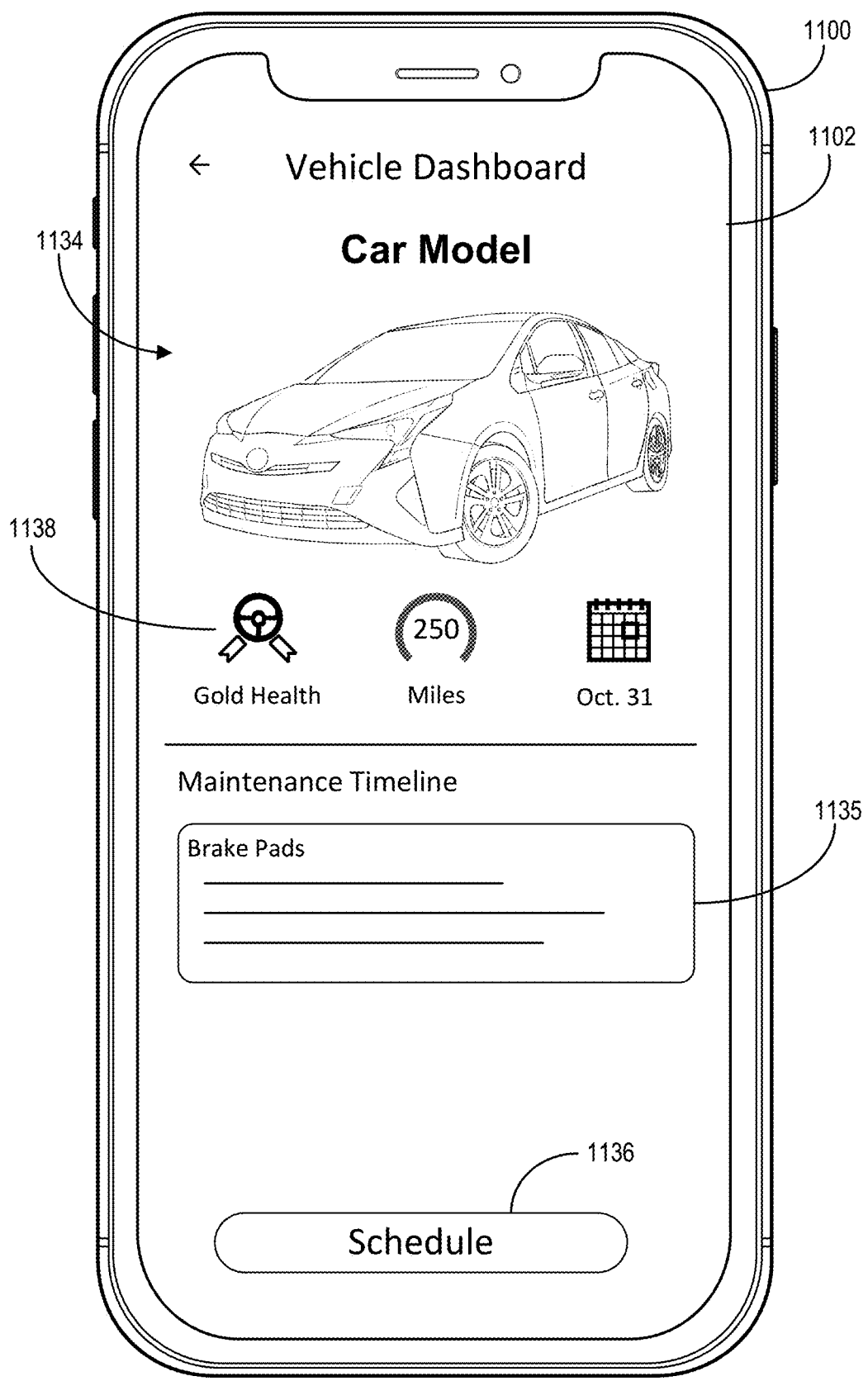

In addition to a service report, the multi-modal transportation system 300 can provide a vehicle dashboard 1134 for the provider vehicle, as shown in FIG. 11E. In particular, the vehicle dashboard 1134 can include general information about the provider vehicle (e.g., model, age, mileage), in addition to a maintenance timeline for the provider vehicle. As part of the maintenance timeline, the vehicle dashboard 1134 can include one or more maintenance items (e.g., maintenance item 1135). The maintenance timeline can include maintenance items that the multi-modal transportation system 300 has determined that the provider vehicle should receive.

For example, the multi-modal transportation system 300 can include preventative maintenance items or critical maintenance items in the maintenance timeline. More specifically, the multi-modal transportation system 300 can identify preventative maintenance items as services that help prevent future issues, such as services defined by a manufacturer's maintenance schedule. To illustrate, the multi-modal transportation system 300 can indicate that a provider vehicle is due for inspection of the brake pads, replacement of windshield wipers or air filters, or other items that may not be immediately necessary to service but help prevent future issues. According to one or more embodiments, preventative maintenance items may be associated with services performed in the maintenance track.

The multi-modal transportation system 300 can also identify critical maintenance items as services that impact safety, reliability, and/or uptime (e.g., that are outside of the manufacturer's maintenance schedule or that can cause immediate operational concerns). For instance, the multi-modal transportation system 300 can identify critical maintenance items based on information obtained during preventative maintenance of a provider vehicle. To illustrate, the multi-modal transportation system 300 can identify critical maintenance items for a provider vehicle such as replacement of brake pads/rotors. According to one or more embodiments, the critical maintenance items can be associated with services performed in the service track or collision track.

In addition to providing a maintenance timeline, the multi-modal transportation system 300 can provide a schedule element 1136 to schedule one or more of the services that the multi-modal transportation system 300 suggested in the maintenance timeline. For example, the schedule element 1136 can cause the provider device 1100 to send a request to the multi-modal transportation system 300 to schedule a service appointment for the provider vehicle. The provider device 1100 can thus provide a scheduling function within the provider application 1102 without requiring the provider to access another application or a separate interface (e.g., a messaging application or phone application). The vehicle dashboard 1134 can thus provide a quick and easy way for providers to access information about the provider vehicle, the vehicle's standing with the multi-modal transportation system 300, and to schedule future service appointments from within a single interface.

As mentioned, the multi-modal transportation system 300 can determine a vehicle health score for a provider vehicle. As used herein, the term "vehicle health score" refers to a value that represents a maintenance status for a provider vehicle. For example, a vehicle health score can indicate whether a provider vehicle is up to date on a maintenance schedule and whether the provider vehicle has any outstanding vehicle maintenance issues. FIG. 11E illustrates that the vehicle dashboard 1134 can include a score indicator 1138 that indicates a vehicle health score of the provider vehicle. As shown, the score indicator 1138 can include a non-numerical representation of the health score (e.g., a specific graphic or color of graphic). For example, the score indicator 1138 may indicate that the health score falls within a range of numerical values. Alternatively, the score indicator 1138 can include a numerical value of the health score visible within the provider application 1102.

Figure 12:
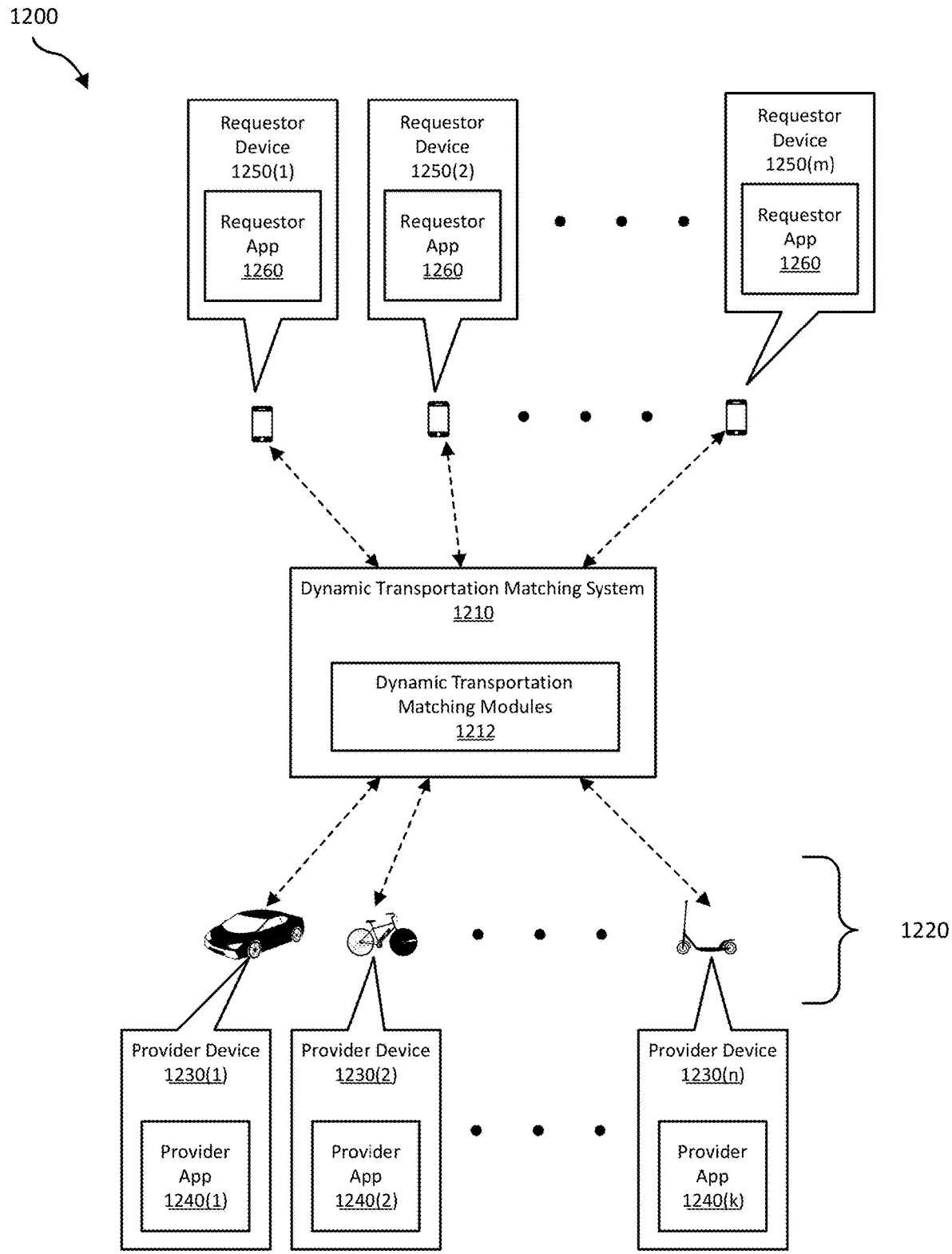
FIG. 12 is a block diagram of an example dynamic transportation management system.

FIG. 12 illustrates an example system 1200 for matching transportation requests with a dynamic transportation network. As shown in FIG. 12, a dynamic transportation matching system 1210 may be configured with one or more dynamic transportation matching modules 1212 that may perform one or more of the steps described herein. Dynamic transportation matching system 1210 may represent any computing system and/or set of computing systems capable of matching transportation requests. Dynamic transportation matching system 1210 may be in communication with computing devices in each of a group of vehicles 1220. Vehicles 1220 may represent any vehicles that may fulfill transportation requests. In some examples, vehicles 1220 may include disparate vehicle types and/or models. For example, vehicles 1220 may include lane-bound vehicles and MMVs. In some examples, some of the vehicles 1220 may be standard commercially available vehicles. According to some examples, some of the vehicles 1220 may be owned by separate individuals (e.g., transportation providers). Furthermore, while, in some examples, many or all of vehicles 1220 may be human-operated, in some examples many of vehicles 1220 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 12 does not specify the number of vehicles 1220, it may be readily appreciated that the systems described herein are applicable to hundreds of vehicles, thousands of vehicles, or more. In one example, dynamic transportation matching system 1210 may coordinate transportation matchings within a single region for 50,000 vehicles or more on a given day. In some examples, vehicles 1220 may collectively form a dynamic transportation network that may provide transportation supply on an on-demand basis to transportation requestors.

As mentioned above, dynamic transportation matching system 1210 may communicate with computing devices in each of vehicles 1220. The computing devices may be any suitable type of computing device. In some examples, one or more of the computing devices may be integrated into the respective vehicles 1220. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1210.

As shown in FIG. 12, vehicles 1220 may include provider devices 1230(1)-(n) (e.g., whether integrated into the vehicle, permanently affixed to the vehicle, temporarily affixed to the vehicle, worn by a driver of the vehicle, etc.). In some examples, provider devices 1230 may include provider apps 1240(1)-(k). Provider apps 1240(1)-(k) may represent any application, program, and/or module that may provide one or more services related to operating a vehicle and/or providing transportation matching services. For example, provider apps 1240(1)-(k) may include a transportation matching application for providers and/or one or more applications for matching MMVs with requestor devices. In some embodiments, different types of provider vehicles may be provisioned with different types of provider devices and/or different provider applications. For example, MMVs may be provisioned with provider devices that are configured with a provider application that enables transportation requestors to reserve and/or operate the MMVs while road-constrained and/or lane-bound vehicles (e.g., cars) may be provisioned with provider devices that are configured with a provider application that enables provider vehicle operators (e.g., transportation providers) to respond to requests from transportation requestors. In some examples, provider applications 1240(1)-(k) may match the user of provider apps 1240(1)-(k) (e.g., a transportation provider) with transportation requestors through communication with dynamic transportation matching system 1210. In addition, and as is described in greater detail below, provider apps 1240(1)-(k) may provide dynamic transportation matching system 1210 with information about a provider (including, e.g., the current location of the provider and/or vehicle) to enable dynamic transportation matching system 1210 to provide dynamic transportation matching and/or management services for the provider and one or more requestors. In some examples, provider apps 1240(1)-(k) may coordinate communications and/or a payment between a requestor and a provider. According to some embodiments, provider apps 1240(1)-(k) may provide a map service, a navigation service, a traffic notification service, and/or a geolocation service.

Additionally, as shown in FIG. 12, dynamic transportation matching system 1210 may communicate with requestor devices 1250(1)-(m). In some examples, requestor devices 1250 may include a requestor app 1260. Requestor app 1260 may represent any application, program, and/or module that may provide one or more services related to requesting transportation matching services. For example, requestor app 1260 may include a transportation matching application for requestors. In some examples, requestor app 1260 may match the user of requestor app 1260 (e.g., a transportation requestor) with transportation providers through communication with dynamic transportation matching system 1210. In addition, and as is described in greater detail below, requestor app 1260 may provide dynamic transportation matching system 1210 with information about a requestor (including, e.g., the current location of the requestor) to enable dynamic transportation matching system 1210 to provide dynamic transportation matching services for the requestor and one or more providers. In some examples, requestor app 1260 may coordinate communications and/or a payment between a requestor and a provider. According to some embodiments, requestor app 1260 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, a micro-mobility service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 13:
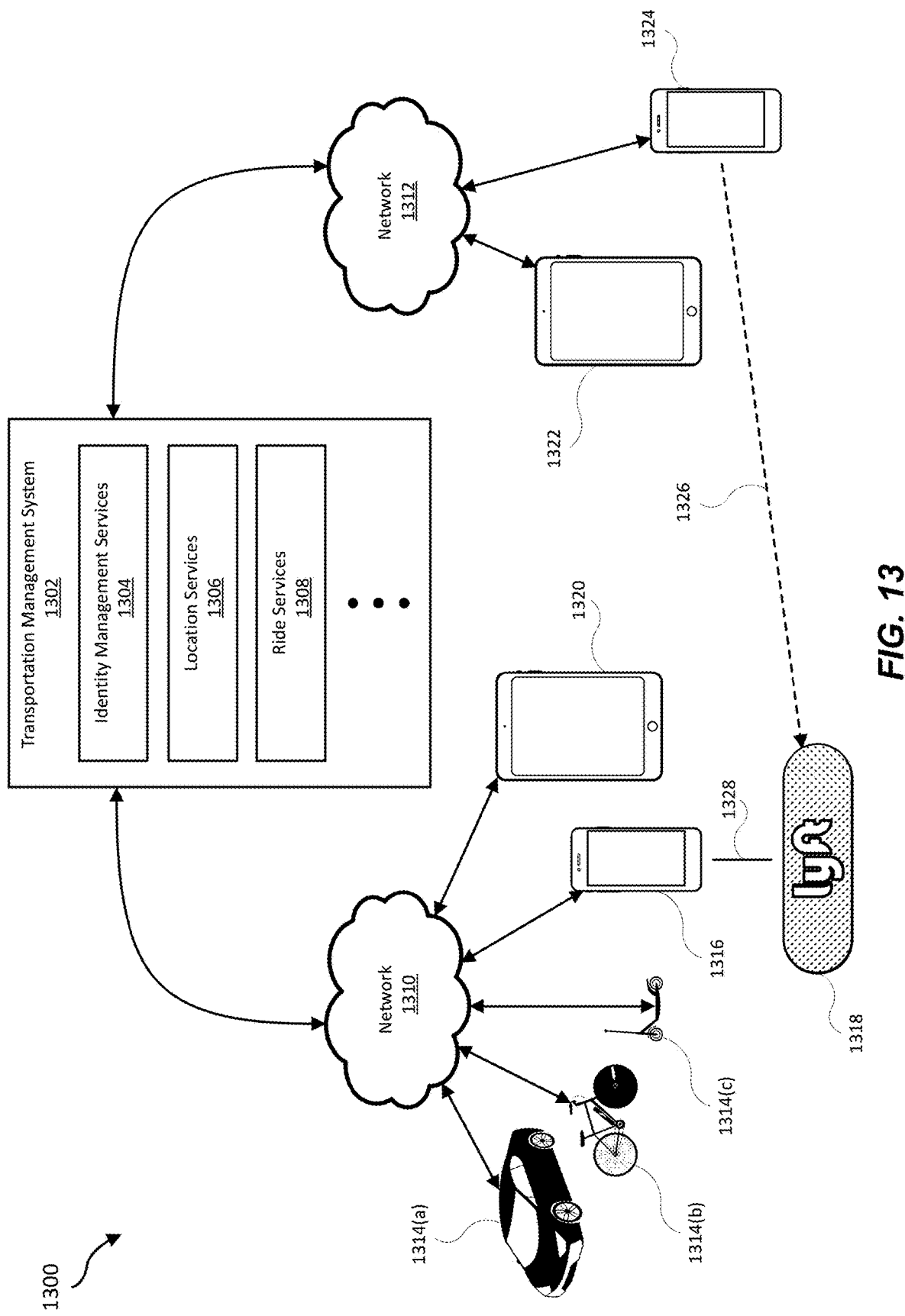
FIG. 13 is an illustration of an example requestor/provider management environment.

FIG. 13 shows a transportation management environment 1300, in accordance with various embodiments. As shown in FIG. 13, a transportation management system 1302 may run one or more services and/or software applications, including identity management services 1304, location services 1306, ride services 1308, and/or other services. Although FIG. 13 shows a certain number of services provided by transportation management system 1302, more or fewer services may be provided in various implementations. In addition, although FIG. 13 shows these services as being provided by transportation management system 1302, all or a portion of any of the services may be processed in a distributed fashion. For example, computations associated with a service task may be performed by a combination of transportation management system 1302 (including any number of servers, databases, etc.), one or more devices associated with a provider (e.g., devices integrated with managed vehicles 1314(*a*), 1314(*b*), and/or 1314(*c*); provider computing devices 1316 and tablets 1320; and transportation management vehicle devices 1318), and/or more or more devices associated with a ride requestor (e.g., the requestor's computing devices 1324 and tablets 1322). In some embodiments, transportation management system 1302 may include one or more general purpose computers, server computers, clustered computing systems, cloud-based computing systems, and/or any other computing systems or arrangements of computing systems. Transportation management system 1302 may be configured to run any or all of the services and/or software components described herein. In some embodiments, the transportation management system 1302 may include an appropriate operating system and/or various server applications, such as web servers capable of handling hypertext transport protocol (HTTP) requests, file transfer protocol (FTP) servers, database servers, etc.

In some embodiments, identity management services 1304 may be configured to perform authorization services for requestors and providers and/or manage their interactions and/or data with transportation management system 1302. This may include, e.g., authenticating the identity of providers and determining that they are authorized to provide services through transportation management system 1302. Similarly, requestors' identities may be authenticated to determine whether they are authorized to receive the requested services through transportation management system 1302. Identity management services 1304 may also manage and/or control access to provider and/or requestor data maintained by transportation management system 1302, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1302 may also manage and/or control access to provider and/or requestor data stored with and/or obtained from third-party systems. For example, a requester or provider may grant transportation management system 1302 access to a third-party email, calendar, or task management system (e.g., via the user's credentials). As another example, a requestor or provider may grant, through a mobile device (e.g., 1316, 1320, 1322, or 1324), a transportation application associated with transportation management system 1302 access to data provided by other applications installed on the mobile device. In some examples, such data may be processed on the client and/or uploaded to transportation management system 1302 for processing.

In some embodiments, transportation management system 1302 may provide ride services 1308, which may include ride matching and/or management services to connect a requestor to a provider. For example, after identity management services 1304 has authenticated the identity of a ride requestor, ride services 1308 may attempt to match the requestor with one or more ride providers. In some embodiments, ride services 1308 may identify an appropriate provider using location data obtained from location services 1306. Ride services 1308 may use the location data to identify providers who are geographically close to the requestor (e.g., within a certain threshold distance or travel time) and/or who are otherwise a good match with the requestor. Ride services 1308 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services 1308 may use rule-based algorithms and/or machine-learning models for matching requestors and providers.

Transportation management system 1302 may communicatively connect to various devices through networks 1310 and/or 1312. Networks 1310 and 1312 may include any combination of interconnected networks configured to send and/or receive data communications using various communication protocols and transmission technologies. In some embodiments, networks 1310 and/or 1312 may include local area networks (LANs), wide-area networks (WANs), and/or the Internet, and may support communication protocols such as transmission control protocol/Internet protocol (TCP/IP), Internet packet exchange (IPX), systems network architecture (SNA), or any other suitable network protocols. In some embodiments, data may be transmitted through networks 1310 and/or 1312 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1310 and/or 1312 may include any combination of networks described herein or any other type of network capable of facilitating communication across networks 1310 and/or 1312.

In some embodiments, transportation management vehicle device 1318 may include a provider communication device configured to communicate with users, such as drivers, passengers, pedestrians, and/or other users. In some embodiments, transportation management vehicle device 1318 may communicate directly with transportation management system 1302 or through another provider computing device, such as provider computing device 1316. In some embodiments, a requestor computing device (e.g., device 102) may communicate via a connection 1326 directly with transportation management vehicle device 1318 via a communication channel and/or connection, such as a peer-to-peer connection, Bluetooth connection, NFC connection, ad hoc wireless network, and/or any other communication channel or connection. Although FIG. 13 shows particular devices communicating with transportation management system 1302 over networks 1310 and 1312, in various embodiments, transportation management system 1302 may expose an interface, such as an application programming interface (API) or service provider interface (SPI) to enable various third parties which may serve as an intermediary between end users and transportation management system 1302.

In some embodiments, devices within a vehicle may be interconnected. For example, any combination of the following may be communicatively connected: vehicle 1314, provider computing device 1316, provider tablet 1320, transportation management vehicle device 1318, requestor computing device 1324, requestor tablet 1322, and any other device (e.g., smart watch, smart tags, etc.). For example, transportation management vehicle device 1318 may be communicatively connected to provider computing device 1316 and/or requestor computing device 1324. Transportation management vehicle device 1318 may establish communicative connections, such as connections 1326 and 1328, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1302 using applications executing on their respective computing devices (e.g., 1316, 1318, 1320, and/or a computing device integrated within vehicle 1314), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1314 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1302. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 14:
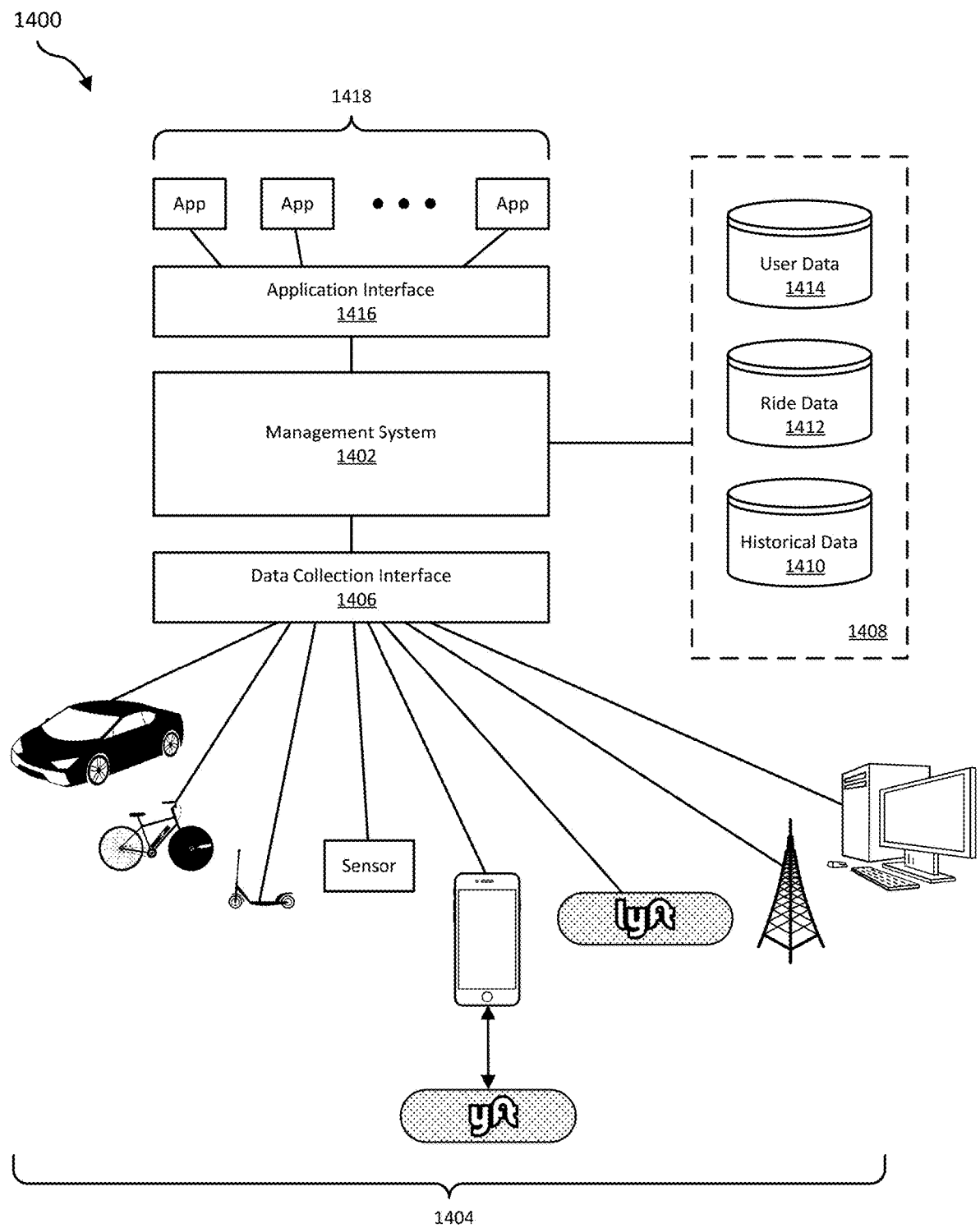
FIG. 14 is an illustration of an example data collection and application management system.

FIG. 14 shows a data collection and application management environment 1400, in accordance with various embodiments. As shown in FIG. 14, management system 1402 may be configured to collect data from various data collection devices 1404 through a data collection interface 1406. As discussed above, management system 1402 may include one or more computers and/or servers or any combination thereof. Data collection devices 1404 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1406 can include, e.g., an extensible device framework configured to support interfaces for each data collection device. In various embodiments, data collection interface 1406 may be extended to support new data collection devices as they are released and/or to update existing interfaces to support changes to existing data collection devices. In various embodiments, data collection devices may communicate with data collection interface 1406 over one or more networks. The networks may include any network or communication protocol as would be recognized by one of ordinary skill in the art, including those networks discussed above.

As shown in FIG. 14, data received from data collection devices 1404 can be stored in data 1408. Data 1408 may include one or more data stores, such as databases, object storage systems and services, cloud-based storage services, and other data stores. For example, various data stores may be implemented on a non-transitory storage medium accessible to management system 1402, such as historical data 1410, ride data 1412, and user data 1414. Data stores 1408 can be local to management system 1402, or remote and accessible over a network, such as those networks discussed above or a storage-area network or other networked storage system. In various embodiments, historical data 1410 may include historical traffic data, weather data, request data, road condition data, or any other data for a given region or regions received from various data collection devices. Ride data 1412 may include route data, request data, timing data, and other ride related data, in aggregate and/or by requestor or provider. User data 1414 may include user account data, preferences, location history, and other user-specific data, each of which may only be gathered, stored, and/or maintained in response to a user proactively agreeing or opting-in to the same. Although certain data stores are shown by way of example, any data collected and/or stored according to the various embodiments described herein may be stored in data stores 1408.

As shown in FIG. 14, an application interface 1416 can be provided by management system 1402 to enable various apps 1418 to access data and/or services available through management system 1402. Apps 1418 may run on various user devices (including provider and requestor computing devices, such as those discussed above) and/or may include cloud-based or other distributed apps configured to run across various devices (e.g., computers, servers, or combinations thereof). Apps 1418 may include, e.g., aggregation and/or reporting apps which may utilize data 1408 to provide various services (e.g., third-party ride request and management apps). In various embodiments, application interface 1416 can include an API and/or SPI enabling third party development of apps 1418. In some embodiments, application interface 1416 may include a web interface, enabling web-based access to data 1408 and/or services provided by management system 1402. In various embodiments, apps 1418 may run on devices configured to communicate with application interface 1416 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A system comprising:
a non-transitory memory; and
one or more hardware processors configured to execute instructions from the non-transitory memory to perform operations comprising:
creating a digital transportation pass that allows transportation requestor devices to request transit via the digital transportation pass within a multi-modal transportation ecosystem that includes a plurality of different transportation modalities;
receiving a first transportation request from a transportation requestor device, the transportation requestor device including a global positioning system (GPS) radio configured to provide a real-time location of the transportation requestor device;
determining a first real-time location of the transportation requestor device;
determining, based at least partially on the first real-time location of the transportation requestor device, that the transportation request satisfies one or more redemption criteria that allow the transportation requestor device to receive the requested transit via the digital transportation pass, wherein the redemption criteria specify a pass coverage zone that identifies different geographically-defined coverage areas in which at least two different transportation modalities will operate under the pass, wherein the geographically-defined coverage area is transmitted to the transportation requestor device for presentation in a user interface;
presenting, on the user interface, an indication that the user is in a pass coverage zone for at least one transportation modality of the plurality of transportation modalities;
determining, based on the real-time location provided by the GPS radio, that the transportation requestor device is in a second, different location covered by a different geographically-defined coverage area;
causing the user interface to show an updated, different pass coverage zone for the transportation modality based on the second, different real-time location of the transportation requestor device; and
upon receiving, via the updated user interface, a second transportation request using the transportation modality, fulfilling the second transportation request in response to determining that the second transportation request satisfies the redemption criteria.

2. The system of claim 1, wherein determining that the transportation request satisfies one or more redemption criteria comprises determining at least one of the following:
that the transportation requestor device is located within the multi-modal transportation ecosystem;
that the transportation request is received at a specified time of day;
that the transportation request is received on a specified day of the week;
that the transportation request is received during a specified event;
that the transportation request identifies a specified pickup location;
that the transportation request identifies a specified drop-off location; or
that the transportation request identifies a specific transportation modality.

3. The system of claim 2, wherein determining that the transportation requestor device is located within the multi-modal transportation ecosystem comprises determining that the transportation requestor device is located within one or more specified geographical boundaries.

4. The system of claim 3, wherein the digital transportation pass enables an entity to specify the geographical boundaries by at least one of:
specifying a center point location and a radius out from which the digital transportation pass is valid; or
drawing the geographical boundaries on a map, such that the digital transportation pass is valid within the drawn boundaries.

5. The system of claim 1, wherein the digital transportation pass allows transportation requestor devices to request transportation via at least one of the following transportation modalities:
an individual ride;
a shared ride;
a scooter;
a bicycle;
a rental vehicle; or
at least one form of public transportation.

6. The system of claim 5, wherein fulfilling the transportation request comprises:
presenting, to the transportation requestor device, at least one of the transportation modalities that are available for selection through the digital transportation pass; and
upon receiving selection of at least one of the available transportation modalities, providing the transportation requestor device access to the at least one selected transportation modality.

7. The system of claim 1, further comprising:
determining that the received transportation request initially satisfies one or more of the redemption criteria;
determining that the received transportation request fails to satisfy at least one subsequent redemption criteria;
at least partially fulfilling the transportation request using the digital transportation pass; and
at least partially fulfilling the transportation request using a second form of value.

8. The system of claim 7, wherein at least partially fulfilling the transportation request using the second form of value comprises applying a personal digital transportation pass in combination with the digital transportation pass.

9. The system of claim 1, wherein fulfilling the transportation request comprises at least one of:
identifying a location where one or more rental vehicles are available for pickup through the digital transportation pass; or
providing the transportation requestor device transportation to the identified location to access the one or more rental vehicles.

10. The system of claim 1, wherein the transportation request comprises a request for vehicle maintenance services that are accessible through the digital transportation pass.

11. The system of claim 10, wherein fulfilling the transportation request for vehicle maintenance services comprises:
determining an initial location of a vehicle associated with the transportation requestor device;
dispatching an entity to transport the vehicle to an automated vehicle servicing center; and upon completion of the requested vehicle maintenance services, dispatching the entity to transport the vehicle back to the initial location.

12. The system of claim 10, wherein fulfilling the transportation request for vehicle maintenance services comprises:
    determining a current location of a vehicle associated with the transportation requestor device; and
    dispatching a vehicle maintenance technician to perform the requested vehicle maintenance services at the current location.

13. A computer-implemented method comprising:
    creating a digital transportation pass that allows transportation requestor devices to request transit via the digital transportation pass within a multi-modal transportation ecosystem that includes a plurality of different transportation modalities;
    receiving a first transportation request from a transportation requestor device, the transportation requestor device including a global positioning system (GPS) radio configured to provide a real-time location of the transportation requestor device;
    determining a first real-time location of the transportation requestor device;
    determining, based at least partially on the real-time location of the transportation requestor device, that the transportation request satisfies one or more redemption criteria for redeeming the digital transportation pass, wherein the redemption criteria specify a pass coverage zone that identifies different geographically-defined coverage areas in which at least two different transportation modalities will operate under the pass, wherein the geographically-defined coverage area is transmitted to the transportation requestor device for presentation in a user interface;
    presenting, on the user interface, an indication that the user is in a pass coverage zone for at least one transportation modality of the plurality of transportation modalities;
    determining, based on the real-time location provided by the GPS radio, that the transportation requestor device is in a second, different location covered by a different geographically-defined coverage area;
    causing the user interface to show an updated, different pass coverage zone for the transportation modality based on the second, different real-time location of the transportation requestor device; and
    upon receiving, via the updated user interface, a second transportation request using the transportation modality, fulfilling the second transportation request in response to determining that the second transportation request satisfies the redemption criteria.

14. The computer-implemented method of claim 13, wherein determining that the transportation request satisfies one or more redemption criteria comprises determining at least one of the following:
    that the transportation requestor device is located within the multi-modal transportation ecosystem;
    that the transportation request is received at a specified time of day;
    that the transportation request is received on a specified day of the week;
    that the transportation request is received during a specified event;
    that the transportation request identifies a specified pickup location;
    that the transportation request identifies a specified drop-off location; or
    that the transportation request identifies a specific transportation modality.

15. A non-transitory computer-readable medium comprising one or more computer-executable instructions that, when executed by at least one processor of a computing device, cause the computing device to:
    create a digital transportation pass that allows transportation requestor devices to request transit via the digital transportation pass within a multi-modal transportation ecosystem that includes a plurality of different transportation modalities;
    receive a first transportation request from a transportation requestor device, the transportation requestor device including a global positioning system (GPS) radio configured to provide a real-time location of the transportation requestor device;
    determine a first real-time location of the transportation requestor device;
    determine, based at least partially on the first real-time location of the transportation requestor device, that the transportation request satisfies one or more redemption criteria that allow the transportation requestor device to receive the requested transit via the digital transportation pass, wherein the redemption criteria specify a pass coverage zone that identifies different geographically-defined coverage areas in which at least two different transportation modalities will operate under the pass, wherein the geographically-defined coverage area is transmitted to the transportation requestor device for presentation in a user interface;
    present, on the user interface, an indication that the user is in a pass coverage zone for at least one transportation modality of the plurality of transportation modalities;
    determine, based on the real-time location provided by the GPS radio, that the transportation requestor device is in a second, different location covered by a different geographically-defined coverage area;
    cause the user interface to show an updated, different pass coverage zone for the transportation modality based on the second, different real-time location of the transportation requestor device; and
    upon receiving, via the updated user interface, a second transportation request using the transportation modality, fulfill the second transportation request in response to determining that the second transportation request satisfies the redemption criteria.

16. The non-transitory computer-readable medium of claim 15, wherein the request from the transportation requestor device specifies a bicycle as a selected mode of transportation, and wherein fulfilling the transportation request includes providing the transportation requestor device access to a specified bicycle within the area associated with the specified location.

17. The non-transitory computer-readable medium of claim 15, wherein the request from the transportation requestor device specifies an individual ride as a selected mode of transportation, and wherein fulfilling the transportation request includes providing the transportation requestor device access to a provider of individual rides within the area associated with the specified location.

18. The non-transitory computer-readable medium of claim 15, wherein the request from the transportation requestor device specifies a shared ride as a selected mode of transportation, and wherein fulfilling the transportation request includes providing the transportation requestor device access to a provider of shared rides within the area associated with the specified location.

19. The non-transitory computer-readable medium of claim 15, wherein the computer-executable instructions further cause the computing device to add one or more transportation requestor accounts to the created digital transportation pass, allowing the added transportation requestor accounts to request and receive transit within the area associated with the specified location.

\* \* \* \* \*